(12) United States Patent
Knopf et al.

(10) Patent No.: US 10,083,806 B2
(45) Date of Patent: Sep. 25, 2018

(54) KEYBOARD FOR ELECTRONIC DEVICE

(71) Applicant: Apple Inc., Cupertino, CA (US)

(72) Inventors: Eric A. Knopf, Cupertino, CA (US);
Matthew P. Casebolt, Cupertino, CA (US); Craig C. Leong, Cupertino, CA (US); Robert Y. Cao, Cupertino, CA (US); Bradford J. Zercoe, Cupertino, CA (US); Dinesh C. Mathew, Cupertino, CA (US); Zheng Gao, Cupertino, CA (US); Ryan P. Brooks, Cupertino, CA (US); Paul X. Wang, Cupertino, CA (US); Bruce E. Berg, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/269,790

(22) Filed: Sep. 19, 2016

(65) Prior Publication Data
US 2017/0011869 A1    Jan. 12, 2017

Related U.S. Application Data

(63) Continuation of application No. 15/154,768, filed on May 13, 2016.
(Continued)

(51) Int. Cl.
*H01H 13/7065* (2006.01)
*G06F 3/02* (2006.01)
(Continued)

(52) U.S. Cl.
CPC ....... *H01H 13/7065* (2013.01); *G06F 1/1662* (2013.01); *G06F 3/0202* (2013.01);
(Continued)

(58) Field of Classification Search
CPC ...... H01H 13/704; H01H 13/70; H01H 13/14; H01H 13/88; H01H 13/02; H01H 3/122; G06F 1/1662; G06F 3/0202
(Continued)

(56) References Cited

U.S. PATENT DOCUMENTS

| 3,657,492 A | 4/1972 | Arndt et al. |
| 3,917,917 A | 11/1975 | Murata |

(Continued)

FOREIGN PATENT DOCUMENTS

| CN | 2155620 | 2/1994 |
| CN | 2394309 | 8/2000 |

(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.

*Primary Examiner* — Renee S Luebke
*Assistant Examiner* — Iman Malakooti
(74) *Attorney, Agent, or Firm* — Dorsey & Whitney LLP

(57) ABSTRACT

An input mechanism is disclosed. The input mechanism includes a dome support structure defining an opening that extends through the dome support structure, a collapsible dome positioned in the opening and engaged with the dome support structure, and a cover member coupled to the dome support structure and covering the collapsible dome, thereby retaining the collapsible dome within the opening of the dome support structure.

21 Claims, 33 Drawing Sheets

Related U.S. Application Data

(60) Provisional application No. 62/214,590, filed on Sep. 4, 2015, provisional application No. 62/233,975, filed on Sep. 28, 2015, provisional application No. 62/161,038, filed on May 13, 2015, provisional application No. 62/161,020, filed on May 13, 2015, provisional application No. 62/161,103, filed on May 13, 2015.

(51) Int. Cl.
| | | |
|---|---|---|
| *H01H 3/12* | (2006.01) | |
| *H01H 13/705* | (2006.01) | |
| *H01H 13/88* | (2006.01) | |
| *H01H 13/02* | (2006.01) | |
| *H01H 13/14* | (2006.01) | |
| *H01H 13/70* | (2006.01) | |
| *H01H 13/04* | (2006.01) | |
| *H01H 13/10* | (2006.01) | |
| *H01H 13/83* | (2006.01) | |
| *G06F 1/16* | (2006.01) | |

(52) U.S. Cl.
CPC .......... *H01H 3/122* (2013.01); *H01H 13/023* (2013.01); *H01H 13/04* (2013.01); *H01H 13/10* (2013.01); *H01H 13/14* (2013.01); *H01H 13/70* (2013.01); *H01H 13/705* (2013.01); *H01H 13/83* (2013.01); *H01H 13/88* (2013.01); *H01H 2203/038* (2013.01); *H01H 2215/004* (2013.01); *H01H 2219/028* (2013.01); *H01H 2219/056* (2013.01); *H01H 2219/062* (2013.01); *H01H 2221/07* (2013.01); *H01H 2223/03* (2013.01); *H01H 2223/054* (2013.01); *H01H 2227/022* (2013.01); *H01H 2229/02* (2013.01); *H01H 2239/056* (2013.01); *H01H 2239/074* (2013.01)

(58) Field of Classification Search
USPC ........................................................ 200/5 A
See application file for complete search history.

(56) References Cited

U.S. PATENT DOCUMENTS

| | | | |
|---|---|---|---|
| 3,978,297 A | 8/1976 | Lynn et al. | |
| 4,095,066 A | 6/1978 | Harris | |
| 4,319,099 A | 3/1982 | Asher | |
| 4,349,712 A | 9/1982 | Michalski | |
| 4,484,042 A | 11/1984 | Matsui | |
| 4,596,905 A | 6/1986 | Fowler | |
| 4,598,181 A | 7/1986 | Selby | |
| 4,670,084 A | 6/1987 | Durand et al. | |
| 4,755,645 A | 7/1988 | Naoki et al. | |
| 4,937,408 A | 6/1990 | Hattori et al. | |
| 4,987,275 A | 1/1991 | Miller et al. | |
| 5,021,638 A | 6/1991 | Nopper et al. | |
| 5,092,459 A | 3/1992 | Uljanic et al. | |
| 5,136,131 A | 8/1992 | Komaki | |
| 5,278,372 A | 1/1994 | Takagi et al. | |
| 5,280,146 A | 1/1994 | Inagaki et al. | |
| 5,340,955 A | 8/1994 | Calvillo et al. | |
| 5,382,762 A | 1/1995 | Mochizuki | |
| 5,397,867 A | 3/1995 | Demeo | |
| 5,408,060 A | 4/1995 | Muurinen | |
| 5,421,659 A | 6/1995 | Liang | |
| 5,422,447 A | 6/1995 | Spence | |
| 5,457,297 A | 10/1995 | Chen | |
| 5,477,430 A | 12/1995 | LaRose et al. | |
| 5,481,074 A | 1/1996 | English | |
| 5,504,283 A | 4/1996 | Kako et al. | |
| 5,512,719 A | 4/1996 | Okada et al. | |
| 5,625,532 A | 4/1997 | Sellers | |
| 5,804,780 A | 9/1998 | Bartha | |
| 5,828,015 A | 10/1998 | Coulon | |
| 5,847,337 A | 12/1998 | Chen | |
| 5,874,700 A | 2/1999 | Hochgesang | |
| 5,875,013 A | 2/1999 | Takahara | |
| 5,876,106 A | 3/1999 | Kordecki et al. | |
| 5,878,872 A | 3/1999 | Tsai | |
| 5,881,866 A | 3/1999 | Miyajima et al. | |
| 5,898,147 A * | 4/1999 | Domzalski | H01H 13/48 200/1 B |
| 5,924,555 A | 7/1999 | Sadamori et al. | |
| 5,935,691 A | 8/1999 | Tsai | |
| 5,960,942 A | 10/1999 | Thornton | |
| 5,986,227 A | 11/1999 | Hon | |
| 6,020,565 A | 2/2000 | Pan | |
| 6,068,416 A | 5/2000 | Kumamoto et al. | |
| 6,215,420 B1 | 4/2001 | Harrison et al. | |
| 6,257,782 B1 | 7/2001 | Maruyama et al. | |
| 6,259,046 B1 | 7/2001 | Iwama et al. | |
| 6,377,685 B1 | 4/2002 | Krishnan | |
| 6,388,219 B2 | 5/2002 | Hsu et al. | |
| 6,423,918 B1 * | 7/2002 | King | H01H 13/48 200/406 |
| 6,482,032 B1 | 11/2002 | Szu et al. | |
| 6,530,283 B2 | 3/2003 | Okada et al. | |
| 6,538,801 B2 | 3/2003 | Jacobson et al. | |
| 6,542,355 B1 | 4/2003 | Huang | |
| 6,552,287 B2 | 4/2003 | Janniere | |
| 6,556,112 B1 | 4/2003 | Van Zeeland et al. | |
| 6,559,399 B2 | 5/2003 | Hsu et al. | |
| 6,560,612 B1 | 5/2003 | Yamada et al. | |
| 6,572,289 B2 | 6/2003 | Lo et al. | |
| 6,573,463 B2 | 6/2003 | Ono | |
| 6,585,435 B2 | 7/2003 | Fang | |
| 6,624,369 B2 | 9/2003 | Ito et al. | |
| 6,706,986 B2 | 3/2004 | Hsu | |
| 6,738,050 B2 | 5/2004 | Comiskey | |
| 6,750,414 B2 | 6/2004 | Sullivan | |
| 6,759,614 B2 | 7/2004 | Yoneyama | |
| 6,762,381 B2 | 7/2004 | Kunthady et al. | |
| 6,765,503 B1 | 7/2004 | Chan et al. | |
| 6,788,450 B2 | 9/2004 | Kawai et al. | |
| 6,797,906 B2 | 9/2004 | Ohashi | |
| 6,850,227 B2 | 2/2005 | Takahashi et al. | |
| 6,860,660 B2 | 3/2005 | Hochgesang et al. | |
| 6,911,608 B2 | 6/2005 | Levy | |
| 6,926,418 B2 | 8/2005 | Ostergård et al. | |
| 6,940,030 B2 | 9/2005 | Takeda et al. | |
| 6,977,352 B2 | 12/2005 | Oosawa | |
| 6,979,792 B1 | 12/2005 | Lai | |
| 6,987,466 B1 | 1/2006 | Welch et al. | |
| 6,987,503 B2 | 1/2006 | Inoue | |
| 7,012,206 B2 | 3/2006 | Oikawa | |
| 7,030,330 B2 | 4/2006 | Suda | |
| 7,038,832 B2 | 5/2006 | Kanbe | |
| 7,126,499 B2 | 10/2006 | Lin et al. | |
| 7,129,930 B1 | 10/2006 | Cathey et al. | |
| 7,134,205 B2 | 11/2006 | Bruennel | |
| 7,146,701 B2 | 12/2006 | Mahoney et al. | |
| 7,151,236 B2 * | 12/2006 | Ducruet | H01H 13/48 200/406 |
| 7,151,237 B2 | 12/2006 | Mahoney et al. | |
| 7,154,059 B2 | 12/2006 | Chou | |
| 7,166,813 B2 | 1/2007 | Soma | |
| 7,172,303 B2 | 2/2007 | Shipman et al. | |
| 7,189,932 B2 | 3/2007 | Kim | |
| 7,256,766 B2 | 8/2007 | Albert et al. | |
| 7,283,119 B2 | 10/2007 | Kishi | |
| 7,301,113 B2 | 11/2007 | Nishimura et al. | |
| 7,312,790 B2 | 12/2007 | Sato et al. | |
| 7,378,607 B2 | 5/2008 | Koyano et al. | |
| 7,385,806 B2 | 6/2008 | Liao | |
| 7,391,555 B2 | 6/2008 | Albert et al. | |
| 7,414,213 B2 | 8/2008 | Hwang | |
| 7,429,707 B2 | 9/2008 | Yanai et al. | |
| 7,432,460 B2 | 10/2008 | Clegg | |
| 7,510,342 B2 | 3/2009 | Lane et al. | |
| 7,531,764 B1 | 5/2009 | Lev et al. | |
| 7,541,554 B2 | 6/2009 | Hou | |

(56) References Cited

U.S. PATENT DOCUMENTS

| | | |
|---|---|---|
| 7,589,292 B2 | 9/2009 | Jung et al. |
| 7,639,187 B2 | 12/2009 | Caballero et al. |
| 7,639,571 B2 | 12/2009 | Ishii et al. |
| 7,651,231 B2 | 1/2010 | Chou et al. |
| 7,679,010 B2 | 3/2010 | Wingett |
| 7,724,415 B2 | 5/2010 | Yamaguchi |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,077,096 B2 | 12/2011 | Chiang et al. |
| 8,080,744 B2 | 12/2011 | Yeh et al. |
| 8,098,228 B2 | 1/2012 | Shimodaira et al. |
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter et al. |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 * | 2/2013 | Liu ................. H01H 3/125 200/310 |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 * | 11/2013 | Jhuang ............. H01H 13/83 200/314 |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,612,674 B2 | 4/2017 | Degner et al. |
| 9,734,965 B2 | 8/2017 | Martinez et al. |
| 9,793,066 B1 | 10/2017 | Brock et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0225965 A1 | 11/2004 | Garside et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0090973 A1 | 4/2012 | Liu |

(56) References Cited

U.S. PATENT DOCUMENTS

| | | |
|---|---|---|
| 2012/0098751 A1 | 4/2012 | Liu |
| 2012/0286701 A1 | 11/2012 | Yang et al. |
| 2012/0292168 A1* | 11/2012 | Chiba .................. H01H 3/125 200/344 |
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Kloeppel et al. |
| 2013/0270090 A1 | 10/2013 | Lee |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0118264 A1 | 5/2014 | Leong et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090570 A1 | 4/2015 | Kwan et al. |
| 2015/0090571 A1 | 4/2015 | Leong et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0332874 A1 | 11/2015 | Brock et al. |
| 2015/0348726 A1 | 12/2015 | Hendren |
| 2015/0370339 A1 | 12/2015 | Ligtenberg et al. |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0259375 A1 | 9/2016 | Andre et al. |
| 2016/0329166 A1* | 11/2016 | Hou ..................... H01H 3/122 |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004937 A1 | 1/2017 | Leong et al. |
| 2017/0004939 A1 | 1/2017 | Kwan et al. |
| 2017/0090106 A1 | 3/2017 | Cao et al. |
| 2017/0301487 A1 | 10/2017 | Leong et al. |
| 2017/0315624 A1 | 11/2017 | Leong et al. |
| 2018/0029339 A1 | 2/2018 | Liu et al. |
| 2018/0040441 A1 | 2/2018 | Wu et al. |
| 2018/0074694 A1 | 3/2018 | Lehmann et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2664979 | 11/2013 |

(56) References Cited

FOREIGN PATENT DOCUMENTS

| | | |
|---|---|---|
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011065126 | 3/2011 |
| JP | 2011150804 | 8/2011 |
| JP | 2011165630 | 8/2011 |
| JP | 2011524066 | 8/2011 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014216190 | 11/2014 |
| JP | 2014220039 | 11/2014 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

\* cited by examiner

KEYBOARD FOR ELECTRONIC DEVICE

CROSS-REFERENCE TO RELATED APPLICATIONS

This application is a continuation patent application of U.S. patent application Ser. No. 15/154,768, filed May 13, 2016 and titled "Keyboard for Electronic Device," which is a nonprovisional patent application of U.S. Provisional Patent Application No. 62/214,590, filed Sep. 4, 2015 and titled "Film-Based Housing and Switch for Keyboard Assembly," U.S. Provisional Patent Application No. 62/233, 975, Sep. 28, 2015 and titled "Illumination Structure for Illumination of Keys," U.S. Provisional Patent Application No. 62/161,038, filed May 13, 2015 and titled "Uniform Illumination of Keys," U.S. Provisional Patent Application No. 62/161,020, filed May 13, 2015 and titled "Keyboard Assemblies Having Reduced Thicknesses and Method of Forming Keyboard Assemblies," U.S. Provisional Patent Application No. 62/161,103, filed May 13, 2015 and titled "Low-Travel Key Mechanism for an Input Device," the disclosures of which are hereby incorporated herein by reference in their entireties.

FIELD

The described embodiments relate generally to electronic devices, and more particularly to input devices for electronic devices.

BACKGROUND

Many electronic devices include one or more input devices such as keyboards, touchpads, mice, or touchscreens to enable a user to interact with the device. These devices can be integrated into an electronic device or can stand alone as discrete devices that can transmit signals to another device either via wired or wireless connection. For example, a keyboard can be integrated into the housing of a laptop computer or it can exist in its own housing.

The keys of a keyboard may include various mechanical and electrical components to facilitate the mechanical and electrical functions of the keyboard. For example, a key may include mechanical structures to allow the key to move or depress when actuated, as well as electrical components to allow an electrical signal to be produced in response to actuation. Due to the relatively small size of such components, as well as the relatively high number of such components contained in a keyboard, designing and manufacturing keyboards may be complex and difficult undertakings.

SUMMARY

An input mechanism includes a dome support structure defining an opening that extends through the dome support structure, a collapsible dome positioned in the opening and engaged with the dome support structure, and a cover member coupled to the dome support structure and covering the collapsible dome, thereby retaining the collapsible dome within the opening of the dome support structure.

An input mechanism includes a frame defining a retention channel along an outer edge of the frame and an opening in a central region of the frame. The input mechanism further includes a cover member positioned over the opening and a collapsible dome positioned in the opening and captured between the cover member and a retention feature of the frame. The retention channel is configured to capture a pivot member between a wall of the retention channel and an object adjacent the frame.

A method of assembling a keyboard includes assembling an input subassembly and coupling the input subassembly to a base plate. Assembling the input subassembly includes positioning a collapsible dome in an opening of a dome support structure to engage the collapsible dome with the dome support structure and coupling a cover member to the dome support structure such that the collapsible dome is retained between the cover member and a retention surface of the dome support structure.

A collapsible dome includes a dome portion comprising a concave surface defining an interior volume, a protruding member extending into the interior volume from the dome portion, and an array of suspension arms extending from an outer edge of the dome portion.

A collapsible dome includes a dome portion and an array of arms extending from an outer edge of the dome portion. The arms are configured to contact a base plate. In response to an actuation force applied to the dome portion, the arms are configured to collapse in response to a first deflection distance, and the dome portion is configured to collapse after the arms collapse in response to a second deflection distance greater than the first deflection distance. The dome portion may be configured to contact the base plate when the arms and the dome portion collapse. The dome portion may define a concave surface defining an interior volume, and the collapsible dome may further comprise an actuation arm extending into the interior volume. The actuation arm may be configured to contact the base plate after the dome portion collapses in response to the actuation force. The dome may further comprise a travel limiting feature configured to limit an amount of deflection of the actuation arm in response to the actuation force. The travel limiting feature may be a protrusion extending from a surface of the dome portion into the interior volume.

An electronic device includes a housing and a keyboard positioned at least partially within the housing. The keyboard includes a base plate positioned within the housing, and a switch housing positioned on the base plate. The switch housing includes pin retention features formed on a peripheral edge of the switch housing. The electronic device also includes an actuation mechanism retained to the base plate with the switch housing. The actuation mechanism includes a pair of wings defining an opening, a hinge coupling the wings together, and pins extending from each wing into respective pin retention features. The switch housing is positioned in the opening of the actuation mechanism.

A key includes a collapsible dome, a keycap positioned above the collapsible dome, a light source, and a light guide positioned at least partially around the collapsible dome and optically coupled to the light source. The light guide includes a light-directing feature operative to direct light around the light guide, a reflection feature operative to reflect the light internally around the light guide, and an illumination feature operative to illuminate the keycap.

A key includes a collapsible dome, a light source, and a light guide positioned at least partially around the collapsible dome and optically coupled to the light source.

An input mechanism includes a switch housing defining an opening, a cover member attached to a surface of the switch housing and covering the opening, and an actuation pad on a surface of the cover member and positioned above the opening. The cover member may comprise an elastomeric material. The input mechanism may further comprise a collapsible dome positioned in the opening, and the actuation pad may be positioned over the collapsible dome. The switch housing may comprise an array of recesses, and the collapsible dome may comprise an array of arms, each arm being positioned in a respective recess. The elastomeric material may be substantially transparent.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
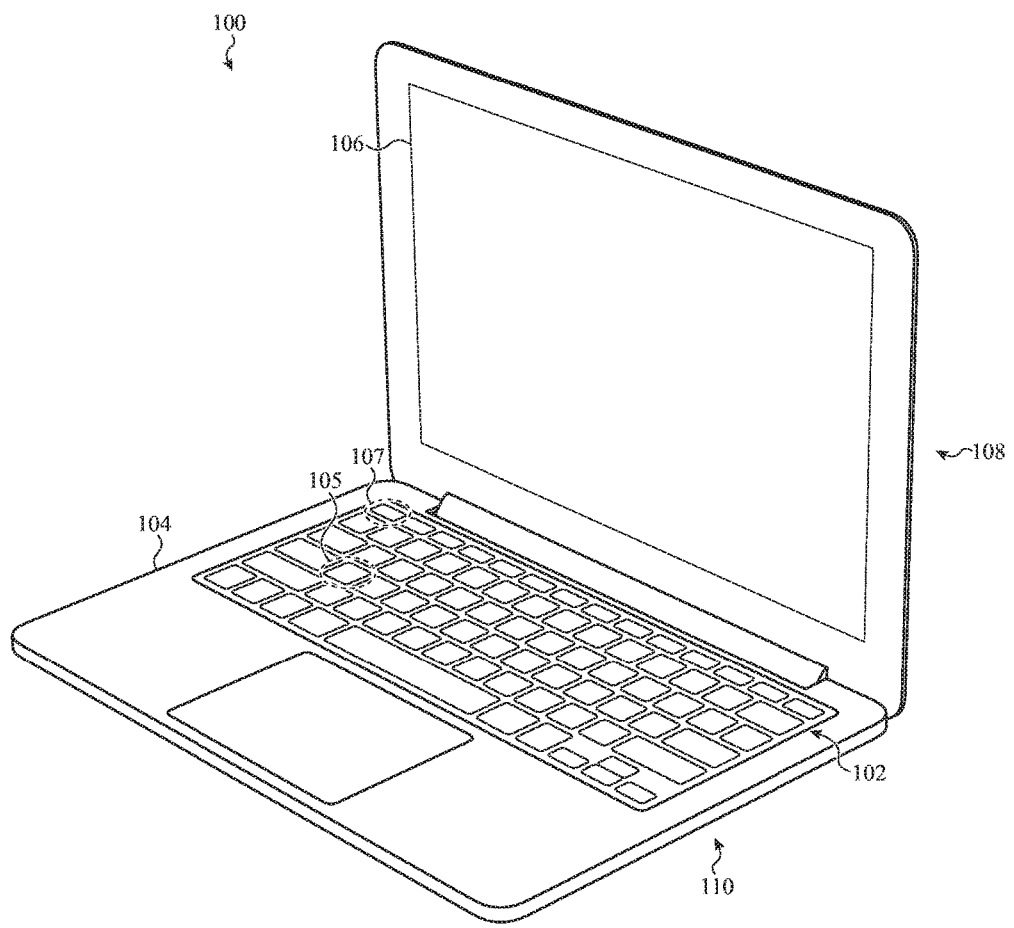
FIG. 1 shows an example computing device incorporating a keyboard.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Keyboards use various different mechanisms to provide mechanical and electrical functionality. For example, keys may include springs or domes to bias the keys to an undepressed or unactuated position, and articulating mechanical structures to moveably couple the keys to a base of the keyboard. Keys may also include electrical contacts, terminals, or switches to detect when a key has been depressed or actuated in order to provide a corresponding input signal to an electronic device.

Manufacturing a keyboard can be challenging. For example, the trend towards smaller devices, such as thinner computers and keyboards, as well as the general requirement for most keyboards to be easily actuated by the fingertips of a person, means that the individual mechanisms are often relatively small. Moreover, keyboards require that a large number of small components be accurately and precisely aligned in order for the device to operate properly. If even one key in a fully assembled keyboard is not working properly, the entire keyboard may be deemed defective. Accordingly, described herein is a keyboard, and components thereof, that can be manufactured with a high degree of accuracy and precision and that results in a low failure rate for the completed keyboards. The modularized components and/or subassemblies described herein may allow more efficient and accurate assembly of keyboards, among other possible benefits, such as the ability to individually test components and subassemblies before they are assembled into a final product.

As described herein, several components of a key may be assembled into a modularized unit or subassembly that can be easily coupled or otherwise attached to a keyboard base. More particularly, a switch assembly including a dome, a switch housing, and a cover member may be pre-assembled for the keys. The dome may be retained in an opening of the switch housing such that the switch assembly forms a single modular unit that can be coupled to a keyboard base. Because the switch assembly is pre-assembled with the dome retained to the switch housing, it can be more easily handled by manufacturing equipment including pick-and-place machines, tape-and-reel machines, or other automation equipment. Moreover, because the dome is retained to the switch housing, it may not be necessary to separately align and/or couple the dome to the keyboard base. By contrast, separately coupling a switch housing and a dome to a base increases the chances that a misaligned part will render a keyboard defective.

The switch assembly may also include an actuation mechanism, such as a butterfly hinge, that is retained to the keyboard base by the switch housing. For example, the switch housing may include retention channels along an outer periphery or peripheral edge of the switch housing, where the open end of the retention channel is configured to be placed against the keyboard base. Pivot pins or other pivot members of a butterfly hinge may be placed into the channels prior to the switch assembly being coupled to the keyboard base, and the switch assembly and the butterfly hinge may be coupled to the keyboard base. Thus, the pivot pins are captured between the keyboard base and the walls of the retention channel, thereby retaining the butterfly hinge to the keyboard base while also positioning the butterfly hinge relative to the keyboard base and the switch housing. Because the butterfly hinge can be pre-assembled with the switch assembly prior to being coupled to the keyboard base, the butterfly hinges may not need to be separately aligned with and coupled to the keyboard base.

The dome that is used in the switch assembly may include features that engage the switch housing to retain the dome to the switch housing, and may also be configured to engage electrical contacts on the keyboard base to register an input when the key is actuated. For example, the dome may include curved arms extending from an outer edge of the dome. The curved arms may engage a feature of the switch housing to retain the dome to the housing. Moreover, a portion of an arm may contact an electrical terminal on the keyboard base when the switch assembly is coupled thereto. Thus, the process of coupling a switch assembly to the keyboard base not only accurately locates and couples the switch housing, the dome, and the butterfly hinge to the keyboard base, but it also makes an appropriate electrical connection between the dome and the electrical terminals of the keyboard.

FIG. 1 shows a computing device 100 having a housing 104 and a keyboard 102 incorporated therein. The keyboard 102 may be positioned at least partially within the housing 104.

As shown, the computing device 100 (or "device 100") is a laptop computer, though it can be any suitable computing device, including, for example, a desktop computer, a smart phone, an accessory, or a gaming device. Moreover, while the keyboard 102 in FIG. 1 is incorporated with the computing device 100, the keyboard 102 may be separate from a computing device. For example, the keyboard 102 may be a standalone device that is connected (via a cable or wirelessly) to a separate computing device as a peripheral input device. The keyboard 102 may also be integrated into another product, component, or device, such as a cover or case for a tablet computer. In such cases, the housing 104 may refer to a housing of any product, component, or device in which the keyboard 102 is integrated or otherwise positioned.

The computing device 100 may also include a display 106 within the housing 104. For example, the display 106 may be within or otherwise coupled to a first portion 108 of the housing 104 that is pivotally coupled to a second portion 110 of the housing 104. The keyboard 102 may be within or otherwise coupled to or incorporated with second portion 110 of the housing 104.

The keyboard 102 includes a plurality of keys, including a representative key 105. While the instant application describes components of a representative key 105 of a keyboard 102, the concepts and components described herein apply to other depressible input mechanisms as well, including buttons, standalone keys, switches, or the like. Moreover, such keys, buttons, or switches may be incorporated into other devices, including smart phones, tablet computers, or the like.

Figure 2:
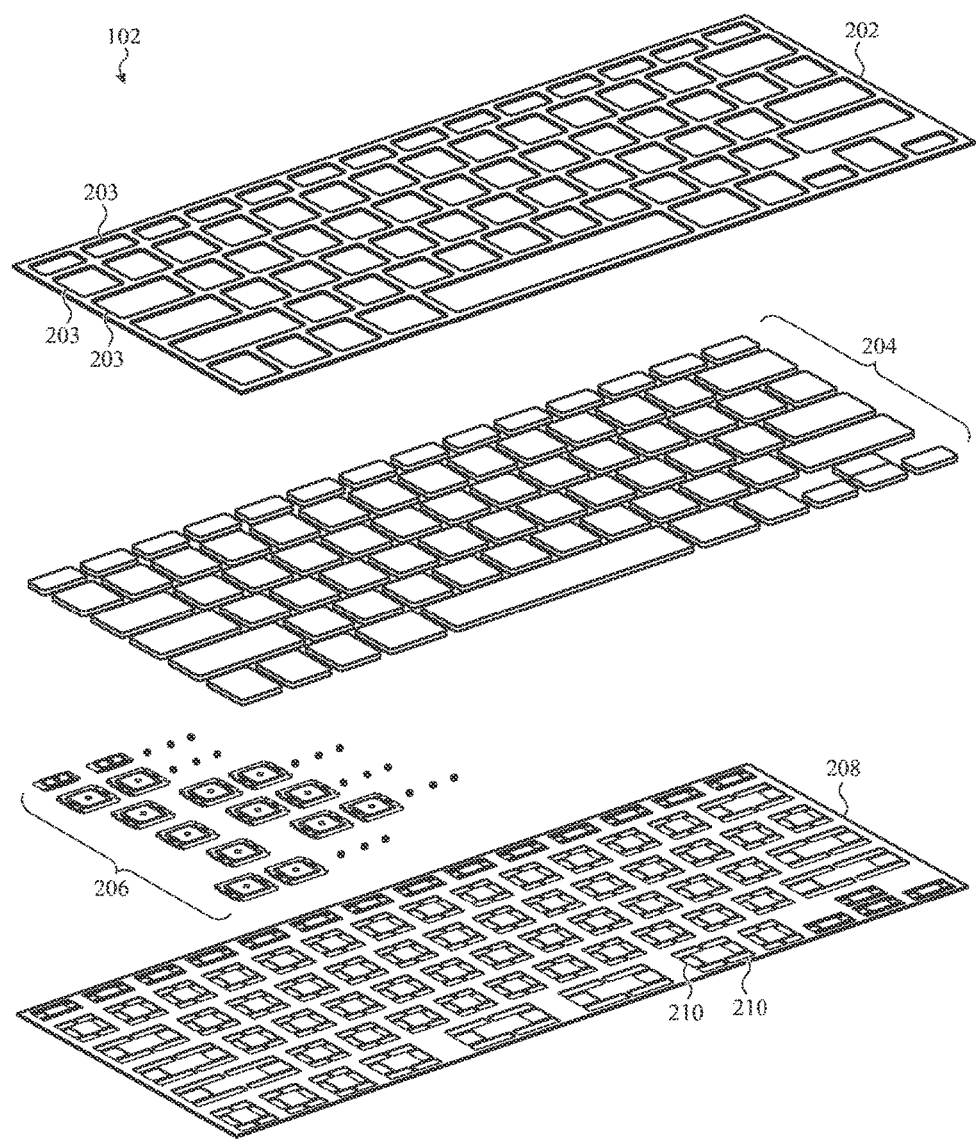
FIG. 2 shows an exploded view of the keyboard of FIG. 1.

FIG. 2 shows an exploded view of the keyboard 102. The keyboard 102 includes a web 202, keycaps 204, switch assemblies 206, and a base plate 208. As used herein, keycaps 204 and switch assemblies 206 may be discussed individually or collectively. It will be understood that a discussion relating to any individual keycap 204 or switch assembly 206 may apply equally to any other keycap or switch assembly of the keyboard 102.

The web 202 may be part of the second portion 110 of the housing 104 (FIG. 1), and may define a plurality of apertures 203 configured to receive keycaps 204 therein. The web 202 may also include other apertures (not shown) for other buttons, input mechanisms, touchpads, microphones, lights, speakers, or other components.

The keycaps 204 are coupled to the switch assemblies 206 and are configured to be manipulated (e.g., pressed or actuated) by a user to provide input to the device 100. For example, the keycaps 204 may be positioned over collapsible domes (e.g., the dome 402, FIG. 4) such that when the keycaps 204 are pressed, the collapsible domes are collapsed to actuate the key and register an input.

The keycaps 204 may include optical elements or materials that are configured to transmit light therethrough. For example, the keycaps 204 may include transparent or translucent portions 315 (FIG. 3) corresponding to glyphs or other symbols commonly found on keycaps. A light from a light source associated with the keycap may be transmitted through such portions to illuminate the keycap. In some cases, a keycap may be formed entirely from a transparent or translucent material. Alternatively, a keycap may have transparent or translucent as well as opaque portions. For example, a keycap may be formed entirely from a transparent or translucent material, and may include a substantially opaque painting, coating, or other layer disposed on a portion of the keycap to produce optical regions within the keycap. As another example, a keycap may be formed with openings corresponding to glyphs, which may be filled with transparent or translucent materials to form illuminable glyphs.

The switch assemblies 206 comprise components that provide mechanical and electrical operations of the key. For example, as described herein, the switch assemblies 206 include a switch housing, a dome, and an actuation mechanism (e.g., a butterfly hinge or other hinge mechanism, scissor mechanism, or the like). The switch assemblies 206 may be pre-assembled prior to being coupled to the base plate 208. The switch assemblies 206 may be referred to as input subassemblies. In particular, as described herein, the switch assemblies 206 may be assembled into a modular subassembly prior to being incorporated into a keyboard or other input mechanism. In such cases, the switch assemblies 206 are subassemblies for the overall input mechanism.

The keyboard 102 also includes a base plate 208. The base plate 208 may be a single component (e.g., a single monolithic structure, such as a single circuit board or other substrate), or may be composed of multiple layers. For example, the base plate 208 may include multiple layers including any of printed circuit boards, membranes, flexible circuit layers, conductive layers, or the like. The base plate 208 may be positioned within and/or coupled to the housing 104.

The switch assemblies 206 may be coupled to the base plate 208. For example, the switch assemblies 206, or a portion thereof, may be glued, staked, screwed, or otherwise coupled to the base plate 208. The base plate 208 may be a circuit board (e.g., a printed circuit board), a housing component of an electronic device, or any other component or substrate to which the switch assemblies 206 may be coupled.

The base plate 208 may include electrical contacts that interact with the domes of the switch assemblies 206 to detect actuations of the keys. For example, the base plate 208 may be a printed circuit board with conductive traces thereon. When a switch assembly 206 is coupled to the circuit board, the dome may be positioned such that, when that key is actuated, the dome forms or completes an electrical path between two conductive traces.

The base plate 208 also defines a plurality of openings 210. Some of the openings 210 may receive components of the switch assemblies 206 therein. For example, portions of a butterfly hinge or a keycap may extend into an opening 210 when the key is actuated or depressed. Some of the openings 210 may also or instead provide clearance between components of the switch assemblies 206 and the base plate 208, such that debris or other contaminants do not interfere with the movement of the key. Examples of the openings 210 are described herein.

Figure 3:
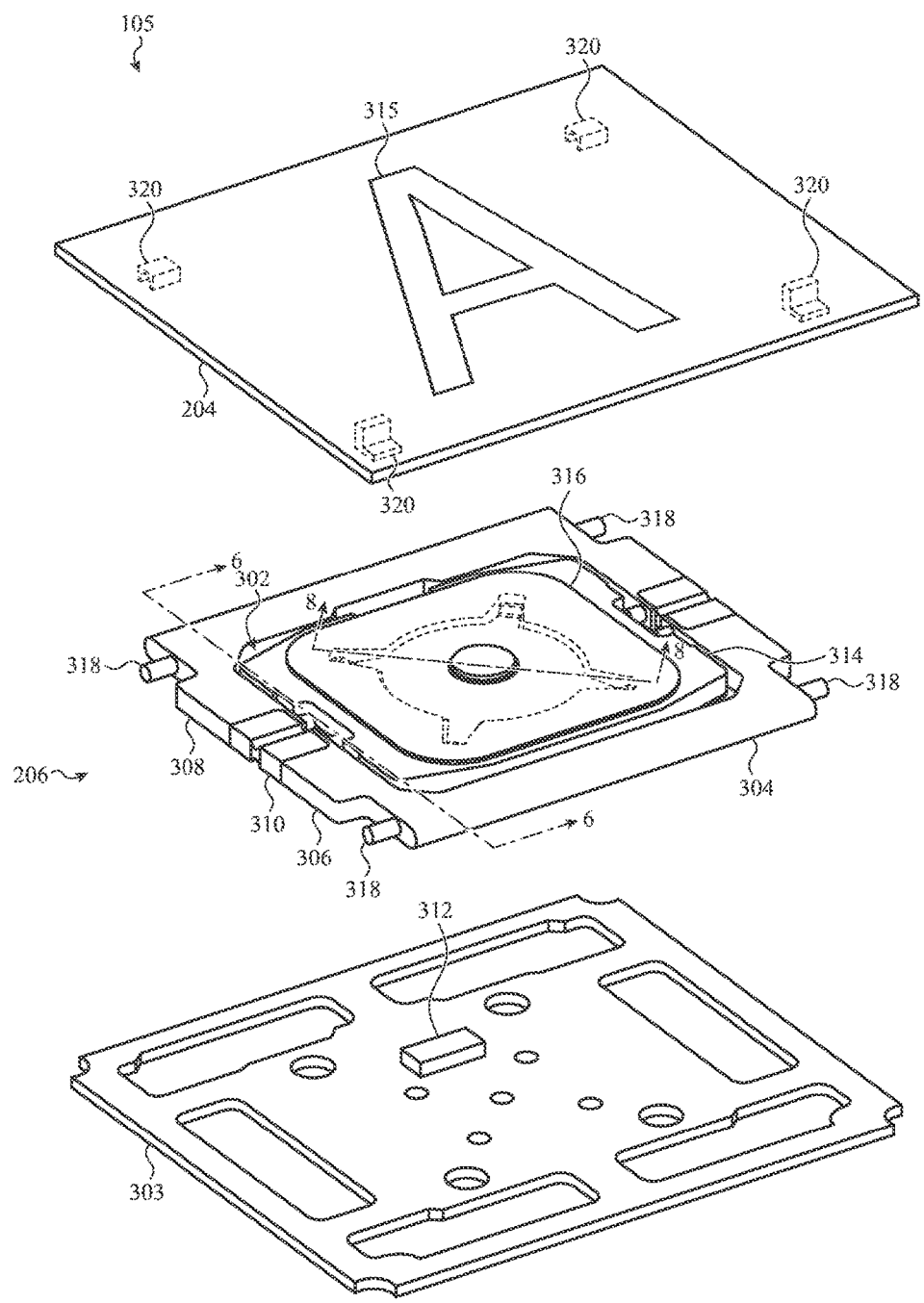
FIGS. 3-4 show exploded views of a key.

FIG. 3 shows an exploded view of a representative key 105. The key 105 includes a keycap 204, a switch assembly 206, and a base 303 (which may be a portion of the base plate 208). The switch assembly 206 in FIG. 3 includes a switch package 302 and an actuation mechanism, such as a butterfly hinge 304 or other hinge mechanism. The switch package 302, described in greater detail with respect to FIG.

4, includes a dome 402 (FIG. 4), a dome support structure 314, and a cover member 316.

The butterfly hinge 304 allows the keycap 204 to move between a depressed and an undepressed position, and may include a first wing 306, a second wing 308, and a hinge 310 coupling the first wing 306 to the second wing 308. The hinge 310 may include any appropriate coupling mechanism or material that attaches the first wing 306 to the second wing 308 while allowing the first wing 306 and the second wing 308 to articulate or move relative to each other. For example, the hinge 310 may include a gear hinge or a living hinge (e.g., a flexible material coupled to both the first and second wings 306, 308).

In the depicted example, the actuation mechanism is a butterfly hinge. However, this is merely one example of an actuation mechanism that may be used in a switch assembly 206, and other actuation mechanisms may be used instead of the butterfly hinge 304 in any given key, including scissor mechanisms, hinge mechanisms, or any other mechanism that movably supports a keycap relative to the switch package 302 or the base 303 (or any other appropriate component).

The keycap 204 may be coupled to the first and second wings 306, 308 via pins 318 extending from the first and second wings 306, 308. The keycap 204 may include retention clips 320 extending from an underside of the keycap 204 that engage the pins 318. One pair of the retention clips 320 may allow its corresponding pins 318 to rotate therein, while another pair may allow its corresponding pins 318 to rotate and slide therein. When the key 105 is actuated (e.g., pressed downward) the ends of the first and second wings 306, 308 where the pins 318 are located will move away from one another. By including at least a pair of retention clips 320 that allow the pins to slide relative to the keycap 204, the wings 306, 308 can articulate relative to one another without being mechanically bound by the retention clips 320.

As shown in FIG. 3, the base 303 may include a light source 312. (Indeed, the base plate 208 may include multiple light sources 312, such as at least one light source for each key 105, or any other appropriate number or distribution of light sources.) The light source may be a light emitting diode (LED), a fluorescent bulb, or any other appropriate light emitting device. The light source may also be a light guide or a light pipe that guides light from a remote light source to the location where the light source 312 is illustrated. The light source 312, or a terminal end of a light guide or light pipe, may be positioned on the base 303 such that, when the switch assembly 206 is attached to the base 303, the light source 312 is positioned proximate a light input surface of the switch package 302. The light input surface, as well as other optical properties of the switch package 302 are discussed herein.

The configuration of the switch assembly 206 in FIG. 3, and in particular the relative arrangement of the switch package 302 and the butterfly hinge 304, may correspond to a state immediately prior to the switch assembly 206 being coupled to the base 303. For example, the butterfly hinge 304 may be coupled to or engaged with the switch package 302 to form a subassembly that can then be placed on and/or coupled to the base 303. Machines, including pick-and-place machines, tape-and-reel machines, surface mount technology (SMT) machines, or any other component placement apparatus may assemble the switch assembly 206 as shown in FIG. 3, position the switch assembly 206 relative to the base 303, and then place the switch assembly 206 on the base 303. As described herein, the process of placing the switch assembly 206 on the base 303 may capture pivot pins or other pivot members of the butterfly hinge between the base 303 and a wall of a channel or recess in the dome support structure 314. This configuration may allow for the butterfly hinge 304 to be retained to the base plate 208 without an additional processing and/or handling step during manufacturing. For example, because the butterfly hinge 304 and the switch package 302 are pre-assembled into an input subassembly, only one placement operation is needed to couple both the butterfly hinge 304 and the switch package 302 to the base 303. This may increase the speed and efficiency with which a keyboard can be assembled, as it reduces the number of discrete placement operations.

Figure 4:
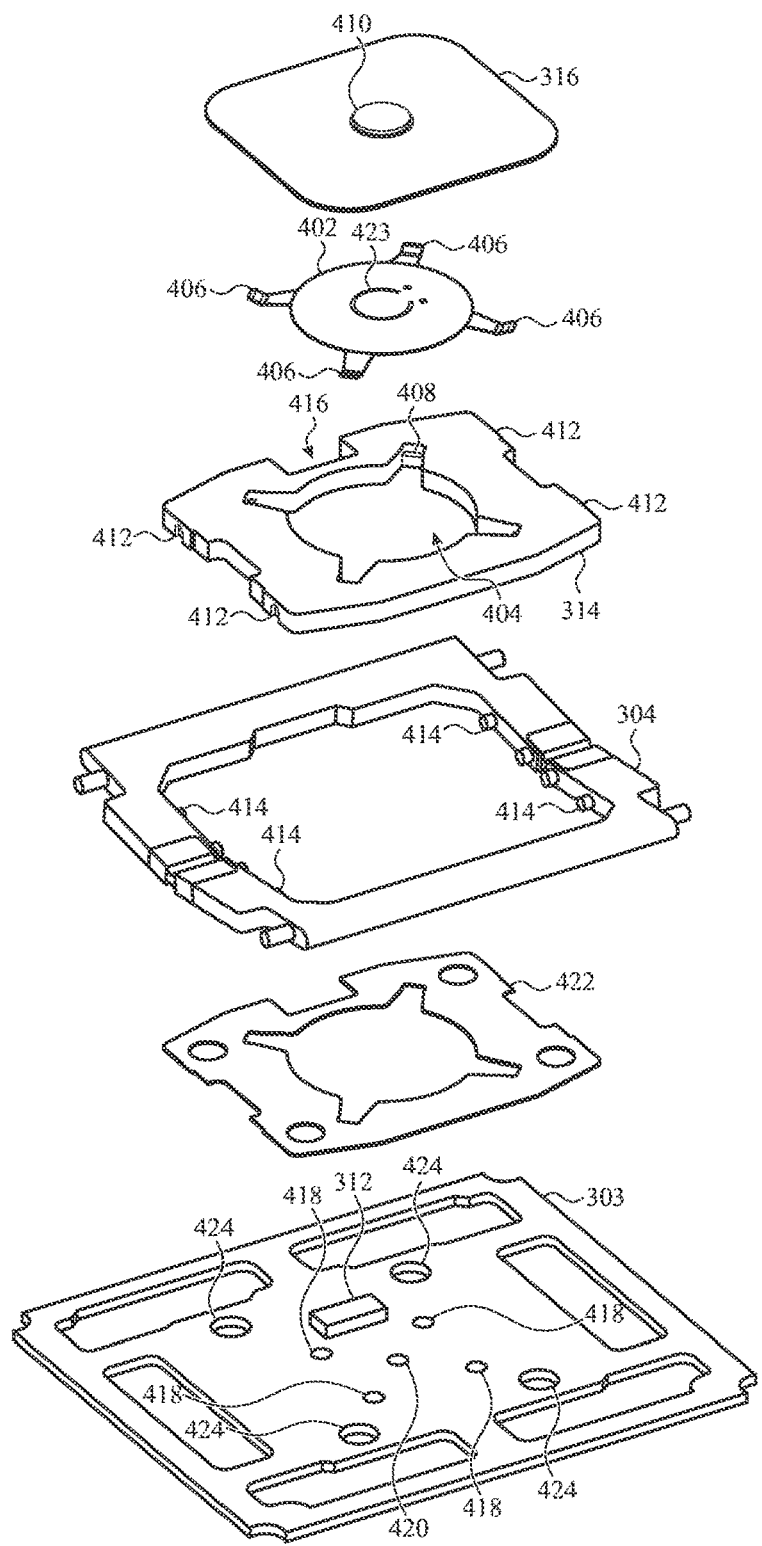

FIG. 4 shows an exploded view of the key 105, showing the components of the switch assembly 206 and the switch package 302 separated from one another. As noted above, the switch package 302 includes a dome support structure 314. The dome support structure 314 may be any structure or component that supports a dome, including a frame, a housing, a portion of a circuit board, or the like. The dome support structure 314, which may also be referred to as a switch housing or a frame, may perform various mechanical and/or electrical functions of the key 105, such as housing and supporting a dome, coupling the dome to a base plate, providing mounting and/or coupling features for an actuation mechanism, and the like. The dome support structure 314 defines an opening 404 that extends through a thickness of the dome support structure 314 (e.g., from a top surface to a bottom surface of the dome support structure 314).

A dome 402, which may be a collapsible dome, is positioned in the opening 404 and is engaged with the dome support structure 314. For example, the dome 402 may include an array of retention features 406 (which may be arms or other members, protrusions, or features) extending from an outer edge of the dome 402. Each retention feature 406 may contact or otherwise engage a respective retention surface 408 of the dome support structure 314 to retain the dome 402 to the dome support structure 314. More particularly, the retention features 406 may overlap the retention surfaces 408 to retain the dome 402 in the opening 404 in at least one direction (e.g., to hold the dome upward, as depicted in FIG. 4). The retention surfaces 408 may be positioned in recesses formed into the dome support structure 314. For example, the retention features 406 (or arms) may be evenly spaced around the dome 402 and may extend radially from the dome 402. The opening 404 in the dome support structure 314 may include corresponding evenly spaced, radially extending recesses into which the retention features 406 extend.

The dome 402 may be any appropriate type of dome, and may be formed from or include any appropriate material. For example, the dome 402 may be a collapsible dome, and may be formed from metal, polymer (e.g., an elastomeric material), or the like. An example dome 402 used in the key 105 is described herein.

A cover member 316 is coupled to the dome support structure 314 and covers the dome 402. The cover member 316 may be or may include a flexible or compliant material (e.g., thermoplastic polyurethane, silicone, or any other appropriate elastomeric or flexible material) that deforms when subjected to an actuation force from the keycap 204 (FIG. 3). The cover member 316 may include an actuation pad 410 configured to transmit the actuation force from the keycap 204 (FIG. 3) to the dome 402. The cover member 316 and the actuation pad 410 may be a single, monolithic component. The cover member 316 may be coupled to the dome support structure 314 using an adhesive, ultrasonic welding, laser welding, mechanical engagement, heat staking, or any other appropriate technique. The cover member 316 may be transparent and/or translucent. For example, the cover member 316 may cover all or part of a light guide 702 (FIG. 7) of the dome support structure 314, and may be transparent and/or translucent to allow light to pass through the cover member 316 to a glyph or other optical element in a keycap.

While the retention surfaces 408 support the dome 402 from the bottom, the cover member 316 supports the dome 402 from above, thus retaining the dome 402 to the dome support structure 314. This configuration results in a self-contained, modular switch package 302 that can be easily moved, manipulated, and assembled with other components. In particular, because the dome is securely retained to the dome support structure 314 (e.g., held between the retention surfaces and the cover member), it can be pre-assembled prior to a final assembly of the keyboard. Retaining the dome 402 to the dome support structure 314 may obviate the need to individually position and couple domes to a base plate of a keyboard, a process that can lead to high manufacturing failure rates. More particularly, domes for keyboards may provide both mechanical and electrical functions for the individual keys, and proper alignment and coupling of the domes to the base plate may be critical to the proper functioning of the keyboard. Where the domes are each individually coupled to a base plate, a single defective or misaligned dome may cause an entire keyboard to be rejected. By coupling the dome 402 to the dome support structure 314 as described herein, the entire switch package 302 can be coupled to the base 303 with one coupling, reducing the chances of misalignment of any given component. Furthermore, because the dome 402 is retained to a mechanical structure prior to being coupled to a base 303, the dome 402 (and indeed the entire switch package 302) can be individually tested prior to assembly into a final keyboard. Thus, defects in the domes (or other issues) that may have resulted in the scrapping of an assembled keyboard can be identified prior to assembly, thus increasing manufacturing yield.

The dome support structure 314 (which is shown as a frame but may be any other dome support structure or switch housing) may also define retention channels 412 (or other pin retention features) along a peripheral edge of the dome support structure 314. For example, the dome support structure 314 may include four retention channels 412, with two retention channels 412 formed in each of two opposing sides of the dome support structure 314. The retention channels 412 may be substantially u-shaped, as shown, such that a pivot pin 414 (or other feature or member) of the butterfly hinge 304 can be introduced into the channel 412 through an opening in the channel 412. The opening may be configured to face or be placed against another component (e.g., the base 303) such that the other component encloses the channel 412, thus capturing the pivot pin 414 in the channel 412.

The channels 412 and the butterfly hinge 304 (and in particular the pivot pins 414) may have a clearance fit, such that the pivot pins 414 can slide freely into the channels 412 (e.g., without obstruction and without requiring a temporary deformation of either the pins 414, the butterfly hinge 304, or the frame 314 or other dome support structure). The clearance fit between these components may help reduce stresses in the components during manufacturing and assembly of a keyboard. Also, the clearance fit may reduce the complexity of a pick-and-place operation (or other type of assembly procedure) to couple the butterfly hinge 304 to the dome support structure 314 prior to being coupled to the base 303. For example, an assembly head may pick up the dome support structure 314, and may thereafter pick up the butterfly hinge 304 such that the pivot pins 414 are slid into the channels 412. The assembly head may hold both the butterfly hinge 304 and the dome support structure 314 (e.g., with a vacuum nozzle or other mechanism) so that they can be placed together on the base 303. While channels 412 are shown, other pin retention features may be used instead of or in addition to the channels 412. For example, the dome support structure or frame 314 may include detents, recesses, blind holes, walls, ledges, slots, and the like.

The dome support structure 314 may also include a light input surface 416. When the key 105 is assembled, the light source 312 may be disposed proximate the light input surface 416 such that light emitted from the light source 312 enters the dome support structure 314 through the light input surface 416. The dome support structure 314 may include or define a light guide 702 (FIG. 7A) that directs the light that is received through the light input surface 416 out of the dome support structure 314 and towards the keycap 204. The light guide 702 and the optical properties of the dome support structure 314 are described in greater detail with respect to FIGS. 7A-7D.

With reference to FIG. 4, when the key 105 is assembled, the dome 402 may communicate through the opening 404 to contact the base 303 when the dome 402 is collapsed (e.g., when the key 105 is actuated). In some cases, the base 303 includes electrical contacts 418, 420, and the dome 402 is configured to contact or otherwise interact with the electrical contacts 418, 420 to facilitate detection of key actuations. For example, the retention features 406 (shown as arms in the present figures) may contact first electrical contacts 418 when the key 105 is assembled. When the dome 402 is collapsed, a different portion of the dome 402 (e.g., the actuation arm 423) may contact the second electrical contact 420. The dome 402 may be formed from or otherwise include a conductive material (e.g., metal). Accordingly, when the dome 402 is collapsed and contacts both the first and second electrical contacts 418, 420, the dome 402 may complete a signal path between the contacts that can be detected by a processing system associated with the key 105. Other electrical switching mechanisms and configurations may also be used. For example, when collapsed, the dome 402 may force a first electrical contact into contact with a second electrical contact. In such cases, the dome 402 may not form a part of the signal path, but instead may act simply as an actuator to force one contact against another contact.

The dome support structure 314 (or switch housing, frame, or other dome support structure) may be coupled to the base 303 with an adhesive 422. The adhesive 422 may have substantially the same footprint as the dome support structure 314, though other configurations are also possible. The adhesive 422 may be positioned on either (or both) the dome support structure 314 and the base 303. The adhesive 422 may be any appropriate adhesive, including curable liquid adhesives, adhesive layers or tapes, or the like.

In some embodiments, the dome support structure 314 is coupled to the base 303 using other mechanisms instead of or in addition to the adhesive 422. For example, the dome support structure 314 may include pins, arms, clips, or other features that mechanically engage and/or retain the dome support structure 314 to the base. As one specific example, the dome support structure 314 may have pins (not shown) that extend through or into openings 424 in the base 303.

The pins may be deformed (e.g., via a heat staking operation) to retain the dome support structure 314 to the base 303.

Regardless of whether or not the pins are configured to fix the dome support structure 314 to the base 303 (e.g., by heat staking), the pins may align the dome support structure 314 (and thus the entire switch assembly 206 and the keycap 204) with respect to the base 303. For example, in some embodiments, the dome support structure 314 is fixedly retained to the base 303 by the adhesive 422 or another fastener, and the pins and openings 424 are used to aid in the alignment and placement of the dome support structure 314 on the base 303 during manufacturing and/or assembly of the keyboard.

Figure 5A:
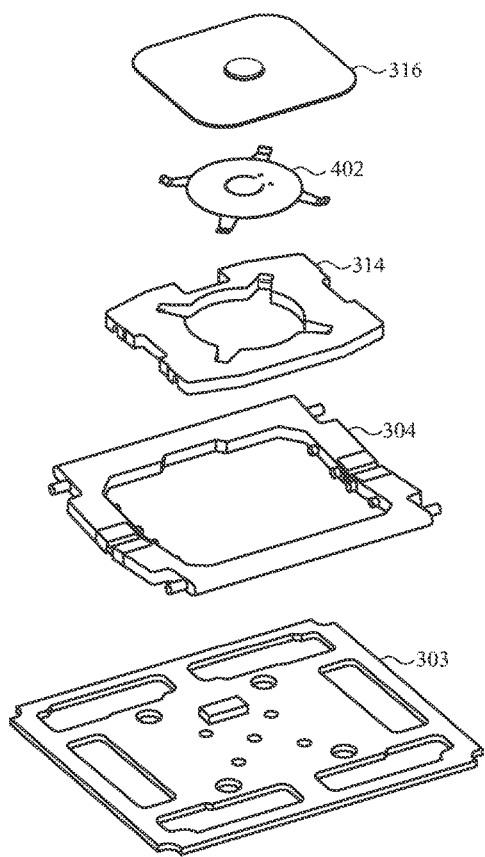
FIGS. 5A-5D show exploded views of the key of FIG. 3 at different stages of an assembly operation.
Figure 5B:
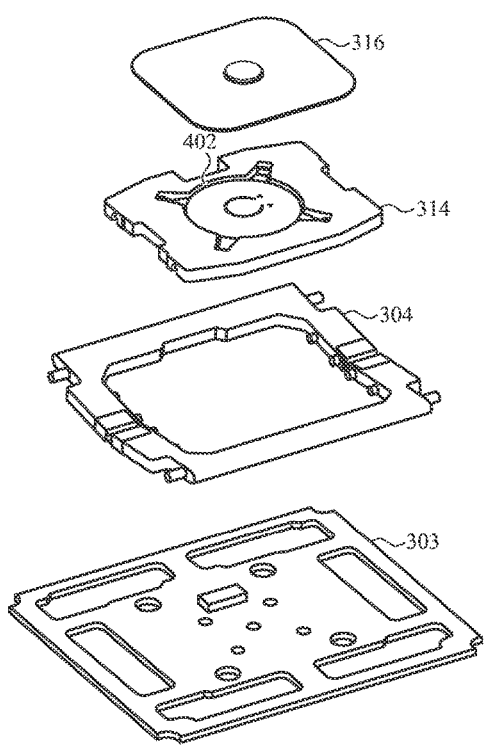

FIGS. 5A-5D show an exploded view of the key 105 at various stages of assembly. FIG. 5A illustrates components of the key 105 in a disassembled state. FIG. 5B illustrates an initial step of assembling the switch package 302, namely, the dome 402 is placed in the opening 404 (FIG. 4) of the dome 402. The retention features 406 (FIG. 4) of the dome 402 may engage with the dome support structure or frame 314 by overlapping and/or contacting the retention surfaces 408 (FIG. 4). As described above, the retention features 406 and the retention surfaces 408 may retain the dome 402 in the dome support structure 314 in at least one direction (e.g., supporting the dome in an upward direction, as depicted in FIG. 5B).

Figures 5C, 5D:
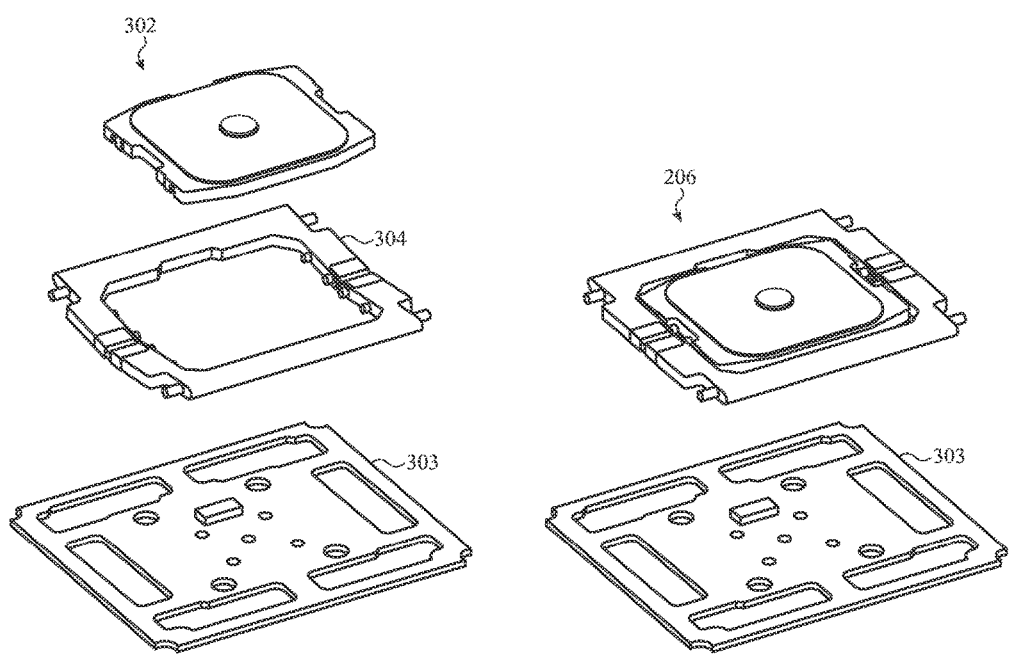

After the dome 402 is placed in the dome support structure 314, the cover member 316 is placed over the dome and is coupled to the dome support structure 314, thus completing the switch package 302 as shown in FIG. 5C. After the switch package 302 is assembled, it may be coupled to the butterfly hinge 304 to form the switch assembly 206, as shown in FIG. 5D. More particularly, the switch package 302 may be inserted into the opening of the butterfly hinge 304 (or the butterfly hinge 304 may be placed around the switch package 302) such that the pivot pins 414 (or other pivot members including posts, rods, protrusions, bumps, arms, or the like) of the butterfly hinge 304 are disposed in the retention channels 412 (or other pin retention features) of the dome support structure 314. The retention channels 412 (or other pin retention features) and the pivot pins 414 may be configured such that when the butterfly hinge 304 and the switch package 302 are coupled as shown in FIG. 5D, the butterfly hinge 304 is not secured to the switch package 302 in a direction towards the base 303. More particularly, the retention channels 412 may have openings facing the base 303, such that the pivot pins 414 can slide out of the retention channels 412 until the switch assembly 206 is placed on and/or coupled to the base 303. Accordingly, an assembly head may hold both the butterfly hinge 304 and the switch package 302 together prior to being placed on the base 303.

As shown in FIG. 5D, the switch assembly 206 is assembled prior to any of its components being coupled to the base 303. By preassembling the switch assembly 206, the assembly of each individual key of a keyboard may be simplified, resulting in greater efficiencies and manufacturing yields. Indeed, preassembling the switch assembly 206 as described herein obviates the need to solder or otherwise electrically or mechanically couple a dome directly to the keyboard base. For example, as described herein, the process of coupling the switch assembly 206 to the base 303 results in the dome 402 being placed in electrical contact with electrical contacts (e.g., the electrical contacts 418), and being physically retained in position by the dome support structure 314 and its mechanical coupling to the base 303.

The assembly sequence in FIGS. 5A-5D may generally correspond to the order of operations of assembly of the key 105, though the exact spatial relationships shown in FIGS. 5A-5D are not necessarily representative of an actual assembly process. For example, the switch package 302 may be assembled at one facility or machine, and then assembled into a keyboard at a different facility or machine. Moreover, other steps may be included between those shown and described herein, and other components may be included in addition to those shown, such as the adhesive 422 (FIG. 4).

Figure 6:
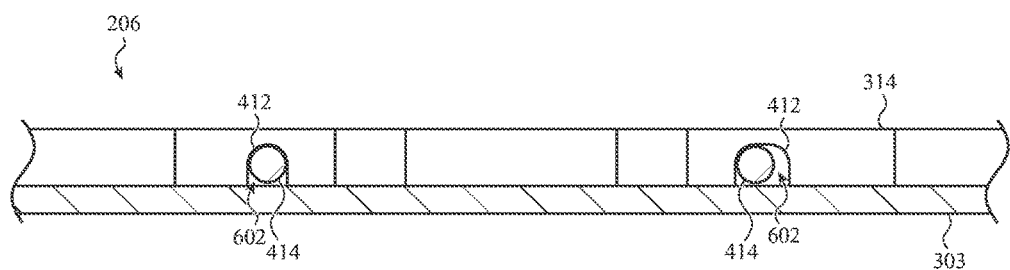
FIG. 6 shows a partial cross-sectional view of the key of FIG. 3 viewed along line 6-6 in FIG. 3.

FIG. 6 shows a cross-sectional view of the switch assembly 206, viewed along line 6-6 in FIG. 3. FIG. 6 shows the switch assembly 206 coupled to the base 303, illustrating how the pivot pins 414 (or other pivot members) are captured in the retention channels 412 by a surface of the base 303. For example, the retention channels 412 are defined by substantially u-shaped walls that have an opening or a gap 602 at one end (e.g., such that the opening faces the base 303). The pivot pins 414 can be introduced into the retention channels 412 via the opening 602 prior to the switch assembly 206 being coupled to the base 303. Once the switch assembly 206 is positioned on the base 303, a surface of the base (or an interstitial layer or component) captures the pivot pins 414 between the walls of the channels 412 and the surface of the base 303 (or any other object that is adjacent the switch assembly 206 when a keyboard is assembled). In this way, the butterfly hinge 304 (FIG. 3) is retained to the base 303.

Figure 7A:
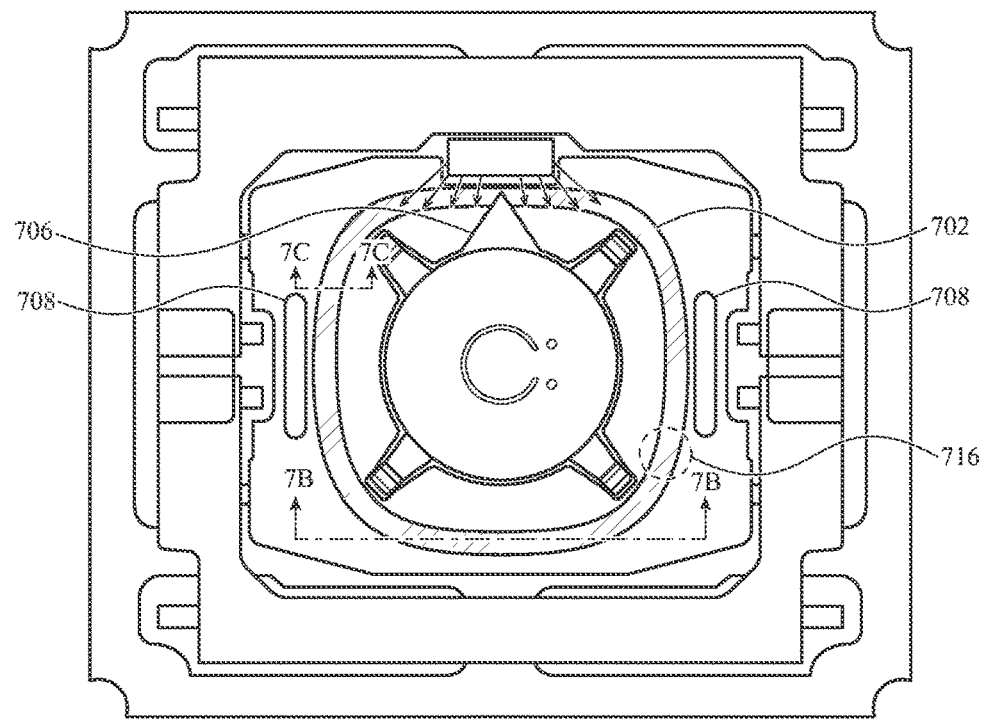
FIGS. 7A-7D show a dome support structure of the key of FIG. 3.
Figure 7B:
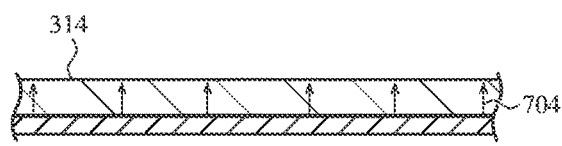
Figure 7C:
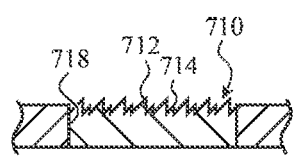

FIG. 7A shows the dome support structure 314 coupled to the base 303 to illustrate the structure and function of the optical elements of the dome support structure 314, including the light guide 702, a light-directing feature 706, reflection features 708, and an illumination feature 710 (FIG. 7C). Features such as the light guide 702, the light-directing feature 706, the reflection features 708, and the illumination feature 710 are not shown in other figures for clarity and/or simplicity. It will be understood that these (or other features) may be present in the dome support structure 314 or any embodiment of a dome support structure, switch housing, frame, or the like, regardless of whether it appears in any particular figure.

The light guide 702 may at least partially surround the opening 404 (FIG. 4) of the dome support structure 314, and thus may at least partially surround the dome 402 (FIG. 4) positioned in the opening. The dome support structure 314 may be positioned on the base 303 such that the light source 312 is proximate the light input surface 416. The light input surface 416 is optically coupled with the light guide 702. Thus, light from the light source 312 enters the dome support structure 314 through the light input surface 416, and is transmitted into the light guide 702, as illustrated by the arrows 704 (FIG. 7B).

The light guide 702 may perform several functions. For example, it may generally contain light from the light source within the light guide 702, rather than allowing it to freely distribute throughout the dome support structure 314. This may result in a greater proportion of the light from the light source 312 being available to be redirected to a keycap (e.g., to illuminate a glyph or other transparent or translucent portion 315 in the keycap 204, FIG. 3) or other illumination target. Second, the light guide 702 redirects light from within the light guide 702 towards the keycap or other illumination target. For example, the light guide 702 may include lenses, ridges, or other optical features that allow light to exit the light guide 702 in a desired direction. More particularly, FIG. 7B shows a side view of the dome support structure 314, illustrating how light may be redirected through a top surface of the dome support structure 314, and thus towards a keycap or other component positioned above the dome support structure.

The dome support structure 314 may include a light-directing feature 706 that is operative to direct light from the light emitting element around the light guide. The light-directing feature 706 may be positioned within the light guide 702 and/or on an outer surface of the light guide 702 near or otherwise adjacent the light source 312. As shown, the light-directing feature 706 may reflect light down the right side of the light guide 702 and the left side of the light guide 702 in order to increase the uniformity of light throughout the light guide 702. The light-directing feature 706 may include one or more structures that may be used to reflect or direct light. In one non-limiting example, the light-directing feature includes one or more Fresnel lenses. Although Fresnel lenses are specifically mentioned, other lenses and/or light-directing features or surfaces may be used. For example, in some embodiments, the light-directing feature 706 can be implemented as a chamfer or notch formed in an inner sidewall of the light guide 702. In other embodiments, the light-directing feature 706 is a non-flat surface such as a convex surface, a concave surface, or a domed surface. In some other non-limiting examples, the light-directing feature 706 can also be coated with a reflective coating or material such as a metalized ink.

The dome support structure 314 may also include one or more one or more reflection features 708. The reflection features 708 may be implemented as a through-hole, a laser etched or routed channel, an insert molded reflector, or the like. The reflection features 708 may be positioned adjacent to the light guide 702 and oriented to direct light (via internal reflection) within the body of the light guide 702. More specifically, the reflection features 708 may be implemented as apertures (filled or open) through the body of the dome support structure 314. In this manner, the reflection features 708 introduce a refractive index mismatch between the material of the body of the dome support structure 314 and air within the aperture, thereby increasing the amount of light that is transmitted through the light guide 702 and decreasing the amount of light that escapes the light guide 702 in undesired directions (e.g., through a side of the dome support structure 314). Accordingly, as light from the light source 312 hits the reflection features 708, the refractive index of the reflection features 708 causes light to be reflected into the light guide 702. Although two reflection features 708 are shown, the dome support structure 314 may include any number of reflection features 708 positioned at various locations around the light guide 702.

With reference to FIG. 7C, which is a partial cross-sectional view of the dome support structure 314 viewed along line 7C-7C in FIG. 7A, the dome support structure 314 may also include an illumination feature (or illumination features) 710 operative to direct light out of the light guide 702 and towards a keycap 204 (or other component or area to be illuminated). For example, the illumination feature 710 may include one or more prisms such as, for example, first prisms 712 and second prisms 714 that are different than the first prisms 712 in one or both of configuration and function. In some embodiments, the dimensions, shapes, sizes, and/or number of the first prisms 712 and the second prisms 714 may vary. For example, the first prisms 712 may be rounded or scalloped while the second prisms 714 have a triangular shape, a concave portion, and so on. The first and second prisms 712, 714 may be operative to interact with light in a different manner. For example, the first prisms 712 may be used to direct light in a first direction while the second prisms 714 may be used to direct light in a second direction.

More specifically, the first prisms 712 may be used to direct light to one more glyphs on a keycap while the second prisms 714 may be used to reflect light internally through the light guide 702. In some implementations, the illumination feature 710 may be placed on specific, discrete areas of the light guide 702 that are less than an entire surface of the light guide 702. In other implementations, such as that shown in FIG. 7A, the illumination feature 710 may cover an entire surface of the light guide 702.

Figure 7D:
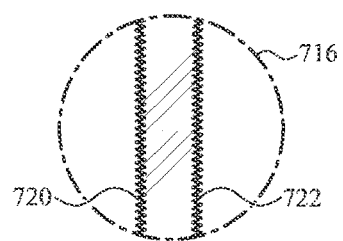

The light guide 702 may be a different material than other portions of the dome support structure 314. For example, the light guide 702 may be a transparent or translucent material that is coupled to the dome support structure 314 (e.g., via co-molding, insert-molding, or multi-shot injection molding, or any other appropriate technique). More particularly, the dome support structure 314 may include a channel 718 into which a material for the light guide 702 is positioned. With reference to FIG. 7D, which shows an expanded view of area 716 in FIG. 7A, the channel 718 may be defined by an inner sidewall 720 and an outer sidewall 722. The sidewalls 720, 722 may form or include prisms or scallops that are configured to reflect light internally within the light guide 702. The prismatic sidewalls 720, 722 may decrease the amount of light lost through the sidewalls of the light guide 702 (relative to a smooth sidewall, for example), and/or guide the light through the light guide 702. The prisms 720, 722 may be used instead of or in addition to the reflection features 708 described above to direct light through the light guide.

Alternatively, the light guide 702 may be the same material as other portions of the dome support structure 314. In such cases, the dome support structure 314 may be formed from or otherwise include a transparent or translucent material, and the light guide 702 may be defined and/or differentiated from the surrounding regions of the dome support structure 314 by a distinct structure, shape, or other property. For example, openings or channels extending through the thickness of the dome support structure 314 (such as the reflection features 708) may define walls of the light guide 702.

In some cases, the dome support structure 314 and the light guide 702 are implemented as a single monolithic structure formed entirely of a transparent or translucent material. In such cases, features such as the reflection features 708, the illumination features 710, and the light-directing feature 706 may be formed in any suitable manner. For example, the dome support structure 314 may include any of these or other features in an as-molded state, or they may be machined, cut, drilled, melted, or otherwise formed into the body of the dome support structure 314. Suitable materials for a dome support structure 314 with a light guide 702 include, without limitation, polycarbonate, polystyrene, polymethlamethacrylate, and glass. Where the dome support structure 314 is transparent, translucent, or otherwise includes a light guide, it may be referred to as an optical dome support structure or an optical switch housing.

Figure 8A:
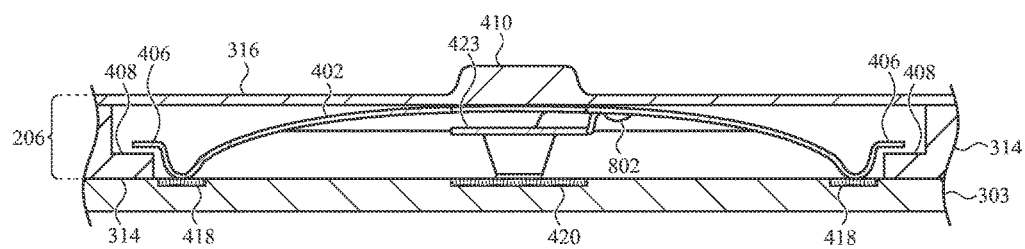
FIGS. 8A-8B show partial cross-sectional views of the key of FIG. 3 viewed along line 8-8 in FIG. 3.
Figure 8B:
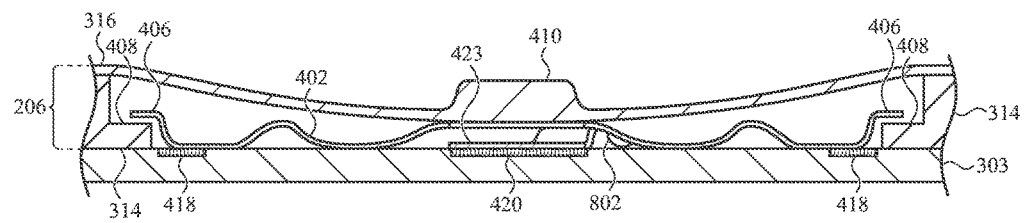

FIGS. 8A-8B show a cross-sectional view of the switch assembly 206, viewed along line 8-8 in FIG. 3. FIG. 8A shows the switch assembly 206 when the key 105 is in an unactuated or undepressed state, and FIG. 8B shows the switch assembly 206 when the key 105 is in an actuated or depressed state. For clarity, some components or portions of the switch assembly 206 are not shown in FIGS. 8A-8B.

FIGS. 8A-8B show how the dome 402 is retained to the dome support structure 314 when the cover member 316 is placed over the dome 402 and coupled to the dome support structure 314. In particular, the retention features 406 of the dome 402 overlap the retention surfaces 408 of the dome support structure 314, thereby retaining the dome 402 in an upward direction (as depicted in the figures). Similarly, the cover member 316 covers the dome 402 and is attached to the dome support structure 314, thereby retaining the dome 402 in a downward direction (as depicted in the figures). As described, this configuration allows the switch assembly 206 to be moved and manipulated as a single, self-contained unit prior to being coupled to a base 303.

The switch assembly 206 may be configured so that the process of coupling the switch assembly 206 to the base 303 preloads or biases the dome 402 against the base 303, and more particularly, against the electrical contacts 418. For example, as shown in FIGS. 8A-8B, the retention features 406 of the dome 402 are not in contact with the retention surfaces 408 of the dome support structure 314 when the switch assembly 206 is positioned on the base 303. More particularly, the geometry of the dome 402 and the dome support structure 314 is such that the dome 402 may be forced upwards against the cover member 316 when the switch assembly 206 is placed on the base 303. The cover member 316 imparts a responsive force on the dome 402 in a downward direction, thus biasing the retention features 406 against the electrical contact 418 to maintain a consistent electrical connection between the dome 402 and the electrical contact 418.

As noted above, the dome 402 may include a protruding member that extends into an interior volume of the dome. As shown in FIGS. 8A-8B, the protruding member is an actuation arm 423, though other types of protruding members may be used, including indentations, springs, foam or elastomeric pads, or the like. When the key 105 is actuated and the dome 402 is collapsed, as shown in FIG. 8B, the actuation arm 423 may contact the electrical contact 420, thus completing an electrical path from the electrical contact 418 to the electrical contact 420.

The actuation arm 423 may deflect when the dome 402 is collapsed. The deflection of the actuation arm 423 may facilitate a positive electrical contact with the electrical contact 420 when the dome 402 is collapsed. The deflection of the actuation arm 423 may also produce a desirable tactile response or sensation to a user. For example, the deflection may prevent or reduce the feeling of the key abruptly bottoming out when it is actuated by a user. Moreover, the deflection of the actuation arm 423 may reduce the stresses on the dome 402 that may be caused by the repeated collapse of the dome 402 during use, for example, by reducing the amount or extent that the dome 402 buckles when the dome 402 is collapsed.

The actuation arm 423 may also decouple the design considerations relating to the stroke length of the dome 402 from the considerations relating to tactile feel. For example, a larger (e.g., taller) dome may provide a more desirable tactile response than a smaller (e.g., shorter) dome, but a shorter stroke length may be desired, which may be achieved in some cases with a smaller dome. By including the actuation arm 423, the stroke length of the dome 402 may be reduced while maintaining a larger dome that provides the desired tactile response.

The dome 402 may also include travel limiting features 802 that extend from the concave inner surface into the interior volume of the dome 402. The travel limiting features 802 may be configured to define a maximum travel of the key 105, as well as to limit an amount of travel or an amount of deflection of the actuation arm 423 when the dome 402 is collapsed. The travel limiting features 802 may be any shape, material, or component that defines a maximum travel distance of the dome 402. For example, as shown in the instant figures, the travel limiting features 802 are indentations in the dome 402. In other embodiments, they may be pads (e.g., plastic or metal pads) that are coupled to the interior surface of the dome 402 (e.g., via adhesive, welding, or any other bonding technique). Travel limiting features 802 may be coupled to or formed on the base 303, or any other component that is between the base 303 and the dome 402. For example, a layer such as a membrane layer, flexible circuit board, or the like (not shown) may be positioned between the base 303 and the switch assembly 206, and a travel limiting 802 feature may extend from the layer to define a maximum travel of the dome 402 and/or a maximum deflection of the actuation arm 423.

Figure 9:
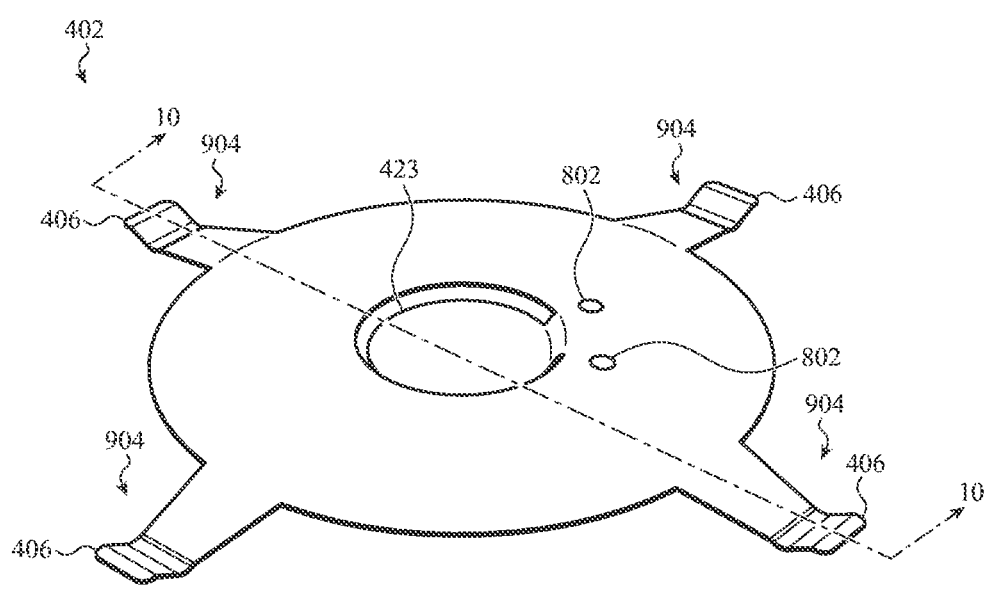
FIG. 9 shows a collapsible dome of the key of FIG. 3.

FIG. 9 shows the dome 402. The dome 402 includes a dome portion 902, an actuation arm 423 (or another protruding member), an array of suspension arms 904, and one or more travel limiting features 802. As shown and described herein, the dome 402 is a collapsible dome. More particularly, the collapsible dome 402 is configured to collapse or otherwise deform in response to an actuation force to provide mechanical and electrical functionality to a key or other input mechanism.

The dome portion 902 may have a convex-concave shape, with the concave surface of the dome portion 902 defining an interior volume. The dome portion 902 may be configured to collapse in response to an actuation force, as shown and described with respect to FIGS. 8A-8B. The particular size, shape, and materials of the dome portion 902 may be selected so that the collapsible dome 402 (or other dome) provides a desired force response, as characterized by a force versus deflection (e.g., travel) curve. An example force versus deflection curve for a key with the collapsible dome 402 is described herein.

The suspension arms 904 extend from an outer edge of the dome portion 902 and support the dome portion 902 away from the base 303 when the collapsible dome 402 is unactuated and/or uncollapsed. The suspension arms 904 may be configured to collapse or deform when the dome is actuated. For example, the suspension arms 904 may be configured to collapse or deform in response to a lower force than the dome portion 902. More particularly, an actuation force applied to a key may first cause the suspension arms 904 to collapse or deform, and thereafter may cause the dome portion 902 to collapse or deform. Thus, the suspension arms 904 may contribute to the particular force response provided by the collapsible dome 402.

The suspension arms 904 may also include the retention features 406. For example, a distal end of a suspension arm 904 may define a retention feature 406 that engages the dome support structure 314 to retain the collapsible dome 402 to the dome support structure 314 in at least one direction. While the instant figures illustrate suspension arms 904 that include retention features 406, and thus provide both retention and suspension functions, these functions may be provided by different components. For example, a dome may include a pair of suspension arms and a separate pair of retention features. Other configurations and combinations are also contemplated.

As described above, the collapsible dome 402 includes an actuation arm 423 that protrudes or extends into the interior volume, and may be configured to contact and deflect against the base 303 when the key 105 is actuated. The actuation arm 423 may be formed from or coupled to the collapsible dome 402 in any appropriate way. In the illustrated example, the actuation arm 423 is formed by removing material from the dome portion to define the actuation arm 423 (e.g., by laser or plasma cutting, stamping, or the like) while leaving the actuation arm 423 connected to the dome portion 902 via a base portion 906. In such cases, the actuation arm 423 and the dome portion 902 are formed from a single piece of material and are a unitary component.

The travel limiting features 802 of the collapsible dome 402 are indentations formed into the dome portion 902 that protrude or extend from the concave surface into the interior volume of the dome portion 902. The travel limiting features 802 may be positioned in any appropriate location along the dome portion 902. In the illustrated example, the travel limiting features 802 are positioned proximate the base portion 906. By positioning the travel limiting features 802 on the dome portion 902 and proximate the base portion 906, as shown, the maximum deflection of the actuation arm 423 and/or the maximum travel of the collapsible dome 402 during actuation of the key 105 can be carefully established. More particularly, positioning the travel limiting features 802 further away from the base portion 906 may be less effective for establishing a maximum deflection of the actuation arm 423 and/or maximum travel of the collapsible dome 402.

Figure 10A:
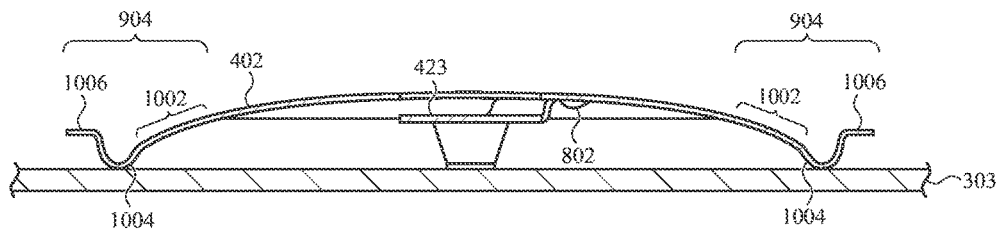
FIGS. 10A-10C show cross-sectional views of the collapsible dome of FIG. 9, viewed along line 10-10 in FIG. 9.
Figure 10B:
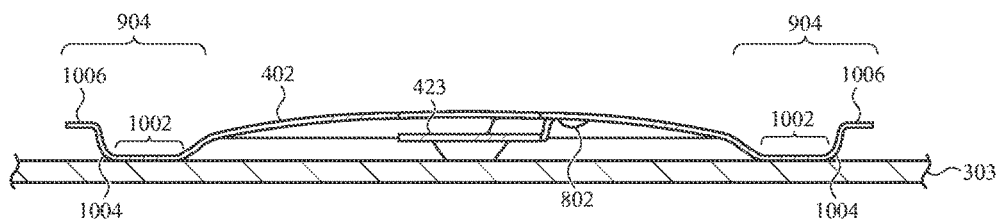
Figure 10C:
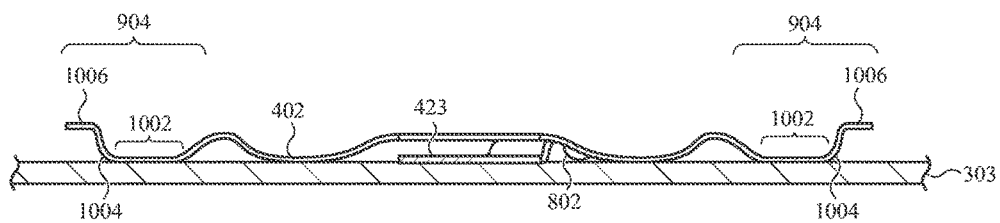

FIGS. 10A-10C show cross-sectional views of the collapsible dome 402, viewed along line 10-10 in FIG. 8, showing the collapsible dome 402 in an unactuated or uncollapsed state (FIG. 10A), a partially collapsed state (FIG. 10B), and an actuated or fully collapsed state (FIG. 10C). While not shown in FIG. 9, the base 303 is included in FIGS. 10A-10C for clarity.

With respect to FIG. 10A, the suspension arms 904 of the collapsible dome 402 each include a collapsible portion 1002 at a proximate end of the suspension arm 904 (e.g., proximate the edge of the dome portion 902), a curved portion 1004 that contacts the electrical contact 418, and an engagement portion 1006 at a distal end of the suspension arm 904. As described herein, the collapsible portion 1002 may be configured to deform or collapse in response to an actuation force on the key 105.

The collapsible portions 1002 of the suspension arms 904 depicted in the instant figures extend from the outer edge of the dome portion 902 along tangent lines of the dome portion 902. In other words, the collapsible portion 1002 of a suspension arm 904 is an extension of the shape, contour, and/or profile of the dome portion 902. In other example domes, the collapsible portions 1002 may deviate from a tangent line of the dome portion 902. For example, the collapsible portions 1002 may extend substantially horizontally from the outer edge of the dome portion 902.

The engagement portions 1006 of the suspension arms 904 may correspond to the retention features 406, described above. In particular, the engagement portion 1006 may engage a retention surface 408 of the dome support structure 314 when the collapsible dome 402 is assembled with the dome support structure 314.

The progression from FIG. 10A to FIG. 10C illustrates how the collapsible dome 402 may respond to application of an actuation force on the key 105. In particular, FIG. 10A represents the collapsible dome 402 prior to any actuation force being applied to the keycap 204. As an actuation force is applied to a keycap 204, the suspension arms 904 begin to deform. As the actuation force continues to increase, the suspension arms 904 eventually completely collapse, corresponding to a first deflection distance of the collapsible dome 402. In some cases, the suspension arms 904 are completely collapsed when they are substantially flat against the base 303, though other configurations are also possible.

As the actuation force continues to increase after the suspension arms 904 are completely collapsed, the dome portion 902 begins to deform slightly until an inflection point is reached, at which point the dome rapidly collapses against the base 303, corresponding to a second deflection distance of the collapsible dome 402 that is greater than the first deflection distance. The inflection point and subsequent rapid collapse of the dome portion 902 may generate an audible and/or tactile output for a user, such as a characteristic "click" of a computer key. Once the dome portion 902 is completely collapsed, the actuation arm 423 (or another portion of the collapsible dome 402) may contact the electrical contact 420, thereby causing a key actuation to be detected by an electronic device.

Figure 11:
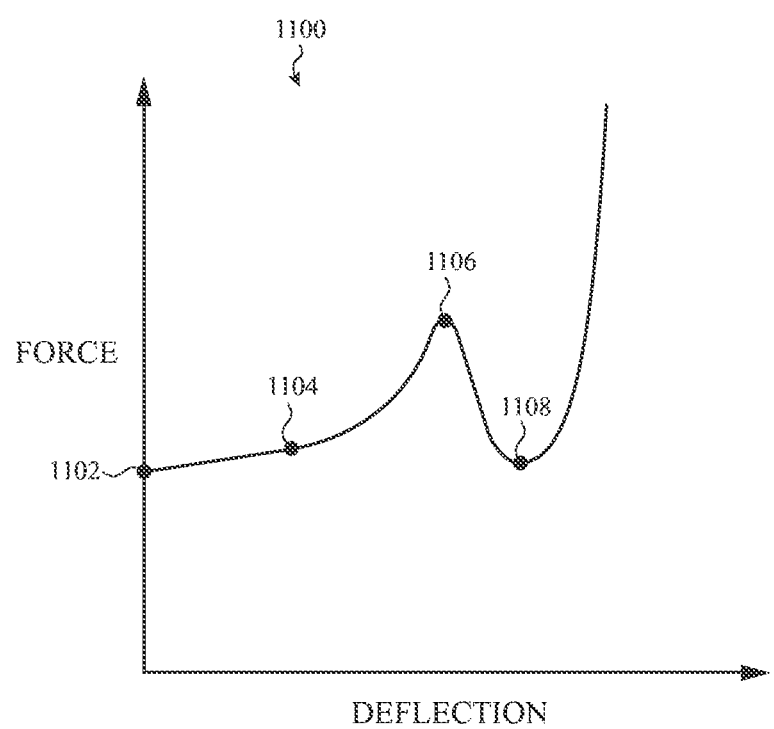
FIG. 11 shows a force versus travel curve of the key of FIG. 3.

FIG. 11 is a force versus deflection (e.g., travel) curve 1100 characterizing the force response of the key 105 (FIG. 1) with reference to the states of the collapsible dome 402 shown in FIGS. 10A-10C. In particular, the key 105 of FIG. 1 may include the collapsible dome 402 described with respect to FIGS. 10A-10C, and certain points and features of the force versus deflection curve 1100 may be understood with reference to FIGS. 10A-10C.

As an actuation force causes the keycap 204 of the key 105 to move and the collapsible dome 402 begins to deform, the force response of the key 105 increases from point 1102 until an inflection point 1106 is reached, at which point the collapsible dome 402 collapses, as described above. Because the collapsible dome 402 includes both suspension arms 904 and a dome portion 902, the portion of the curve 1100 between points 1102 and 1104 may correspond primarily or exclusively to deformation of the suspension arms 904, and the portion of the curve 1100 between points 1104 and 1106 may correspond primarily or exclusively to deformation of the dome portion 902. Of course, the deformations of the suspension arms 904 and the dome portion 902 may blend together. For example, the deflection of the dome portion 902 and the suspension arms 904 may overlap across all or part of the curve 1100 between points 1102 and 1106.

After the inflection point 1106, the resistive force of the collapsible dome 402 decreases until it reaches the operating point 1108, which may correspond to the actuation arm 423 (or any other portion of the collapsible dome 402) contacting the base 303. Under normal operating conditions and forces, the operating point 1108 may be at or near a maximum travel of the key 105, and thus may correspond to a point at which the collapsible dome 402 is fully or substantially fully collapsed and the travel limiting features 802 (FIG. 8) are in contact with the base 303.

The key 105, or other input mechanism or structure that includes the collapsible dome 402 (or other dome), may be configured such that the collapsible dome 402 contacts the electrical contact 420, and thus results in a detectable key actuation event, at any appropriate point along the force/deflection curve 1100. For example, the collapsible dome 402 my contact the electrical contact 420 at or near the inflection point 1106. As another example, the collapsible dome 402 my contact the electrical contact 420 at or near the operating point 1108. As yet another example, the collapsible dome 402 my contact the electrical contact 420 between the inflection point 1106 and the operating point 1108.

Certain physical characteristics of the dome 402, including the material, dimensions, shape, and the like, may determine the particular force versus deflection curve exhibited by the key 105. Moreover, the relative sizes, thicknesses, curvatures, shapes, materials, and/or other properties of the dome portion 902, the suspension arms 904, and/or the actuation arm 423 may determine the force versus deflection curve. Moreover, the different portions or components of a dome 402 may affect different aspects of the force versus deflection curve. For example, increasing the length of the suspension arms 904 (and in particular a length of the collapsible portions 1002 of the suspension arms 904) may increase the stroke length of the key 105 without substantially changing the force at the inflection point 1106. As another example, changing the angle of the suspension arms 904 with respect to a tangent line extending from the outer edge of the dome portion 902 may change the stroke length of the key 105 without substantially changing the force at the inflection point 1106. Other changes or modifications to the collapsible dome 402 shown and described herein are also contemplated.

In FIG. 11, the point 1102 (e.g., where the curve 1100 begins) may indicate a point at which a non-zero force results in zero displacement of the key 105. That is, the curve 1100 does not necessarily show the force response of the key 105 from a point of zero force, but rather from a point where displacement of the key 105 begins. In some cases, the force response of the key 105 from the origin (e.g., a point of zero force and zero displacement) to point 1102 may be characterized by a substantially vertical path, reflecting a key 105 for which no displacement takes place until a threshold force is reached. In other cases, the force response of the key 105 from the origin may follow another profile, such as a line having a slope of less than infinity (e.g., a non-vertical line), or it may follow a nonlinear path. Moreover, portions of the curve 1100 that are shown as linear or substantially linear may instead be nonlinear, and segments that are shown as nonlinear may be linear or may include linear portions. For example, the linear portion extending from point 1102 towards point 1104 may instead follow or include a curved path. Indeed, the curve 1100 is merely one example force versus deflection curve, and the key 105 may be characterized by other curves representing different force responses.

Figure 12:
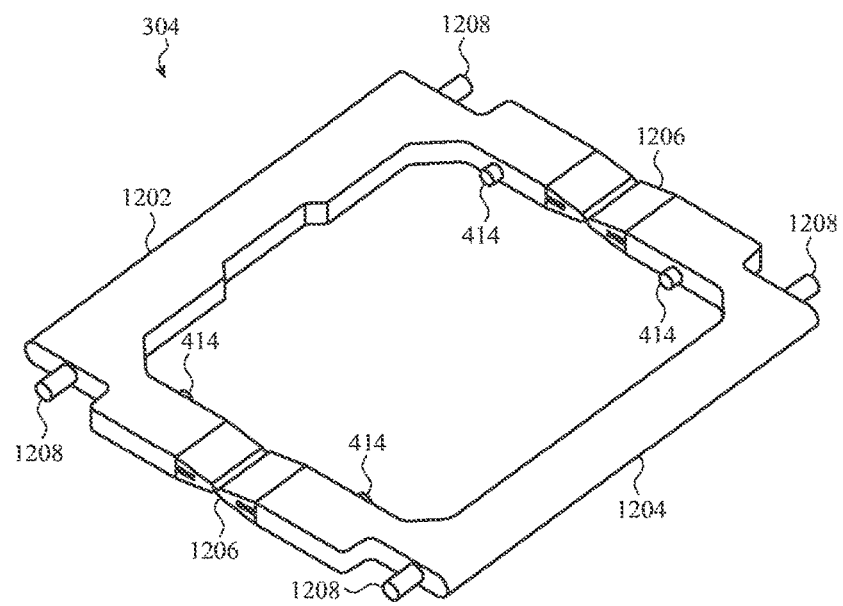
FIG. 12 shows a butterfly hinge of the key of FIG. 3.

FIG. 12 shows a butterfly hinge 304 that includes a first wing 1202 coupled to a second wing 1204 via a coupling mechanism 1206. The butterfly hinge 304 may be an embodiment of the butterfly hinge 304, described above. As shown, the coupling mechanism 1206 is a living hinge, though other coupling mechanisms 1206 may also be used, including a gear hinge or other flexible linking mechanism. As used herein, a living hinge may be a flexible material or combination of materials that physically attaches the two wings together. A gear hinge is a coupling mechanism built into the wings themselves that allows for a gear-like interaction between the wings.

The coupling mechanism 1206 mechanically links the first and second wings 1202, 1204 such that a force applied to one wing will result in the movement of both wings. This may provide consistent actuation of a key regardless of where on the keycap an actuation force is applied. For example, if a user presses on a corner of the keycap of the key 105 (FIG. 1), the actuation force may be unevenly distributed between the first and second wings 1202, 1204. Because the wings 1202, 1204 are coupled via the coupling mechanism 1206, the movement of the wings may be substantially synchronized despite the difference in forces applied thereto. This may cause the keycap to remain substantially parallel to its rest position throughout the keystroke, which in turn allows the keycap to interact with a dome of the key 105 evenly and consistently no matter where on the keycap the actuation force is applied.

The wings 1202, 1204 may include the pivot pins 414 or other pivot members, as well as keycap coupling members 1208. The keycap coupling members 1208 may engage retention features (e.g., retention clips) on a corresponding keycap 204. The pivot pins 414 and the keycap coupling members 1208 may be integrally molded with the wings 1202, 1204. For example, the wings 1202, 1204 may be each formed as a single, monolithic component via an injection molding process (or any other appropriate manufacturing technique). Where a mold is used to form the wings 1202, 1204, the mold's parting lines may be positioned away from the pivot pins 414 and/or the keycap coupling members 1208 such that flashing or excess material is not formed on the pivot pins 414 or the keycap coupling members 1208. This may help prevent binding, scraping, or other negative interactions between the pins 414 and the coupling members 1208 and the corresponding surfaces or components that they engage with when a key is actuated.

The butterfly hinge 304 may be manufactured using a double-shot process, where the first shot forms the wings 1202, 1204, and the second shot forms the living hinge 1206. As described herein, the wings 1202, 1204 may include interlocking structures and/or shapes, including pins, channels, protrusions, or the like, that engage the living hinge 1206. When the second shot is applied, the material of the second shot flows into or around the interlocking structures. Once cured or hardened, the living hinge 1206 forms complementary structures (e.g., channels, protrusions, receptacles, etc.) that retain the living hinge material to the wings 1202, 1204.

FIGS. 13-24 illustrate example wings and living hinges for use in a butterfly hinge, such as the butterfly hinge 304. The wings and living hinges shown and described in these figures may be formed using a double-shot process (or any other suitable process or technique), in which the material of the living hinges is caused to engage interlocking structures on the wings. For clarity, some components of the butterfly hinges in FIGS. 13-24 are shown in phantom lines. Also, for ease of reference, the butterfly hinges and components thereof in FIGS. 13-24 may be labeled with unique reference numbers. However, it will be understood that these figures relate to example embodiments of the butterfly hinge 304, and the components shown in and described with respect to these figures may provide the same or similar functionality of the butterfly hinge 304 described above, and may be in some respects identical to the butterfly hinge 304 described above. Moreover, in these figures, portions of the butterfly hinges and/or living hinges are shown in broken lines to show details of internal components.

Figure 13:
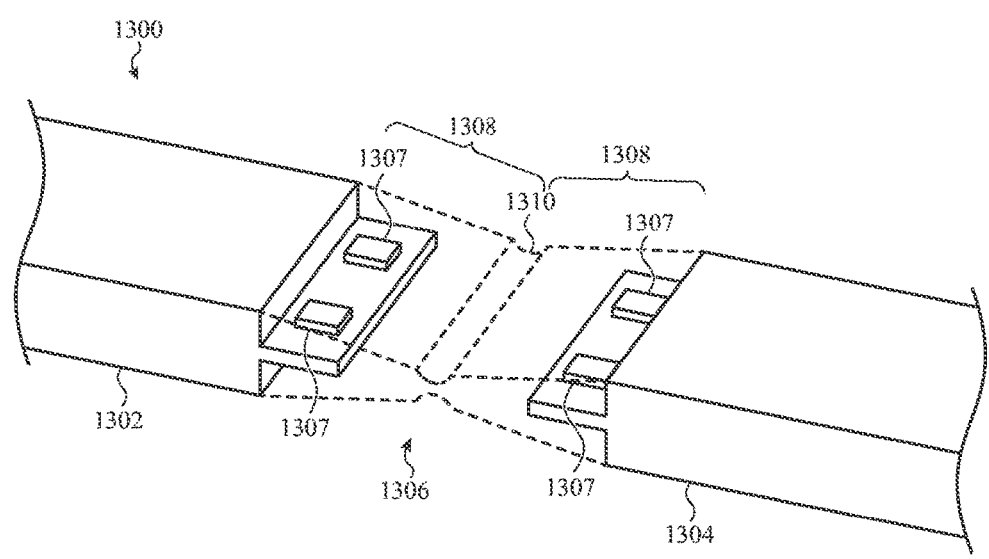
FIGS. 13-24 show examples of living hinges usable in the butterfly hinge of FIG. 12.

FIG. 13 shows a portion of a butterfly hinge 1300 with wings 1302, 1304 that include protrusions 1307 with which a living hinge 1306 engages to retain the living hinge 1306 to the wings 1302, 1304. In particular, during manufacturing, the material of the living hinge 1306 flows around the protrusions 1307 during the second shot to form complementary engagement structures within the living hinge 1306.

The living hinge 1306 may have coupling portions 1308 and a joining portion 1310. The joining portion 1310 may be thinner than the coupling portions 1308 to facilitate flexing of the living hinge 1306 during actuation of a key. The coupling portions 1308 may engage the first and second wings 1302, 1304 to retain the living hinge 1306 to the wings 1302, 1304.

Figure 14:
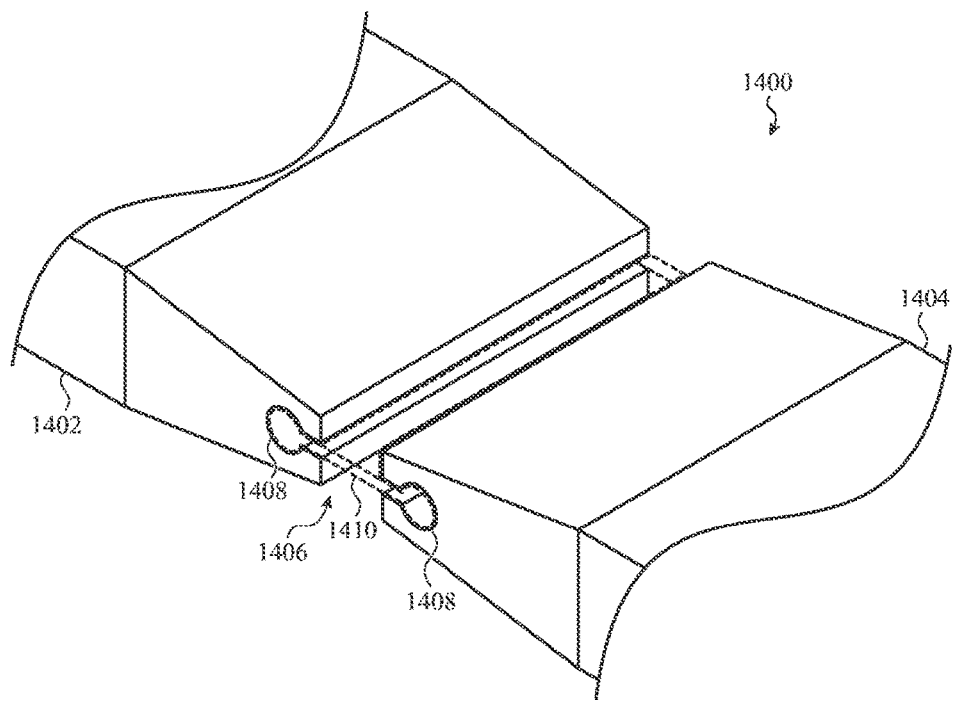

FIG. 14 shows a butterfly hinge 1400 with wings 1402, 1404 that include channels 1408. The material of a living hinge 1406 flows or is forced into the channels 1408 during the second shot to form complementary structures in the living hinge 1406 that retain the living hinge 1406 to the wings 1402, 1404. The living hinge 1406 includes a joining portion 1410 that is substantially the same size as the opening in the channels 1408. That is, apart from the portions of the living hinge that are in the channels 1408, the living hinge 1406 has a substantially constant thickness. The thickness of the joining portion 1410 of the living hinge may be selected based on various factors, including a desired stiffness or flexibility, a material used, a desired durability, manufacturing concerns, and the like.

Figure 15:
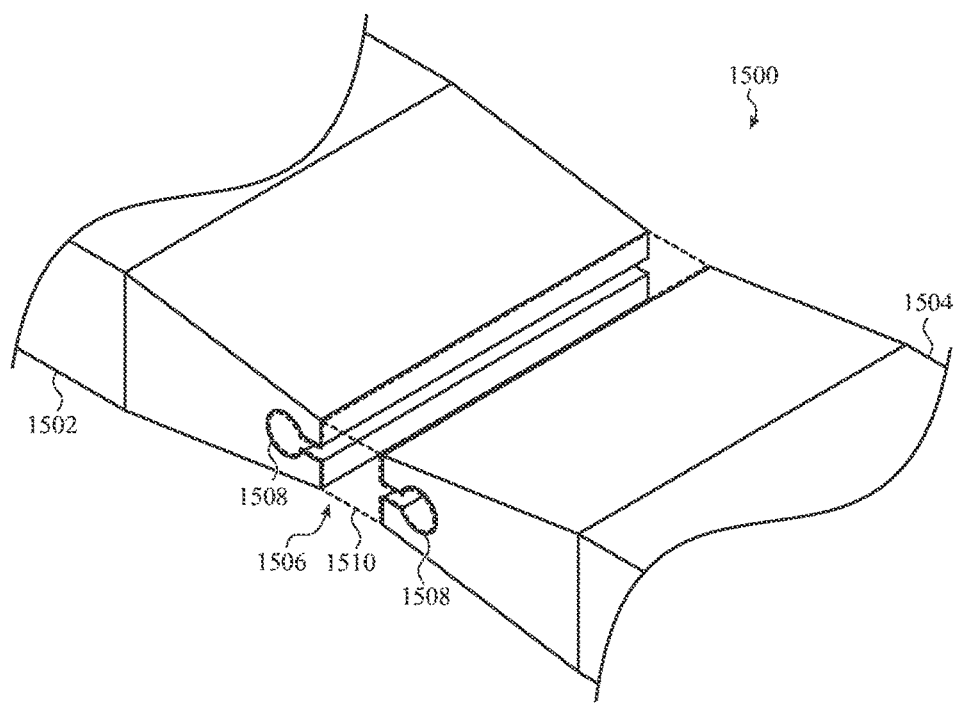

FIG. 15 shows a butterfly hinge 1500 where the wings 1502, 1504 include channels 1508, similar to the channels 1408 in FIG. 14. A portion of a living hinge 1506 engages the channels 1508 in a similar manner to retain the living hinge 1506 to the wings 1502, 1504. Unlike the living hinge 1406, a joining portion 1510 of the living hinge 1506 is thicker than the opening in the channels 1508. In some embodiments, such as that shown in FIG. 15, the joining portion 1510 forms a substantially continuous surface (e.g., with no gaps, ledges, or other discontinuities) with the surfaces of the wings 1502, 1504.

Figure 16:
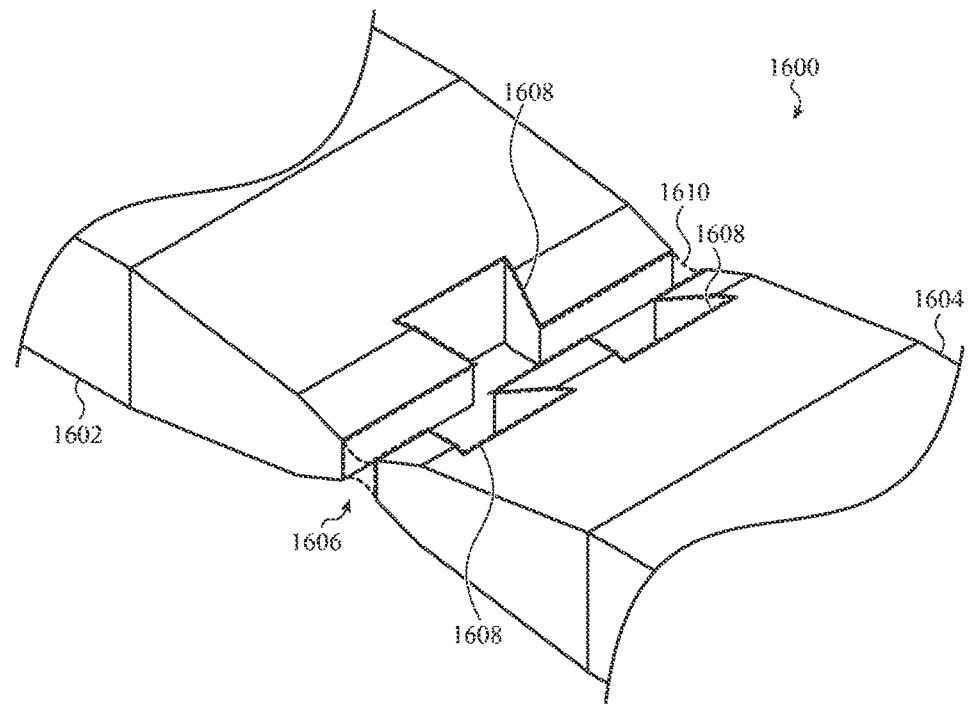

FIG. 16 shows a butterfly hinge 1600 where the wings 1602, 1604 include cutouts 1608. The material of a living hinge 1606 flows or is forced into the cutouts 1608 during a second shot to form complementary structures in the living hinge 1606 that retain the living hinge 1606 to the wings 1602, 1604. The cutouts may extend generally perpendicular to an axis about which the living hinge 1606 pivots (e.g., perpendicular to a longitudinal axis of a joining portion 1610).

Figure 17:
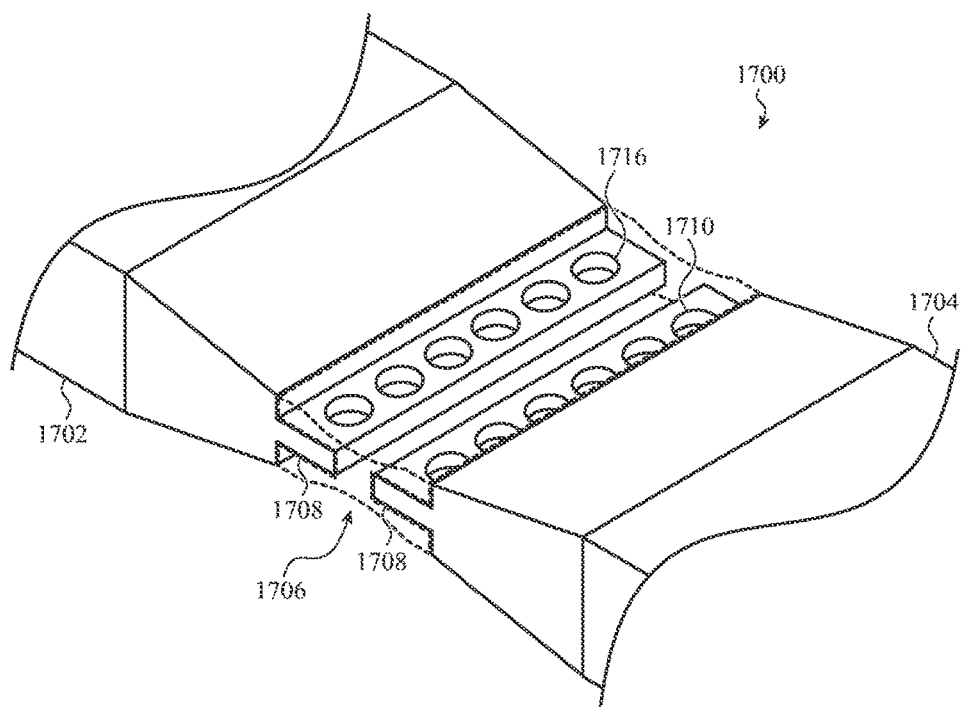

FIG. 17 shows a butterfly hinge 1700 where the wings 1702, 1704 include tongues 1708. The tongues 1708 may include openings 1710, such as blind holes or through-holes. The material of a living hinge 1706 flows or is forced into the openings 1710 during the second shot to form complementary structures in the living hinge 1706 that retain the living hinge 1706 to the wings 1702, 1704. In some cases, the tongues 1708 may be substantially featureless (e.g., having substantially continuous surfaces with no holes or other engagement features), and the living hinge 1706 may be adhered or bonded to the tongues 1708. For example, the material of the living hinge 1706 may act as an adhesive that secures the living hinge 1706 structure to the tongues 1708.

Figure 18:
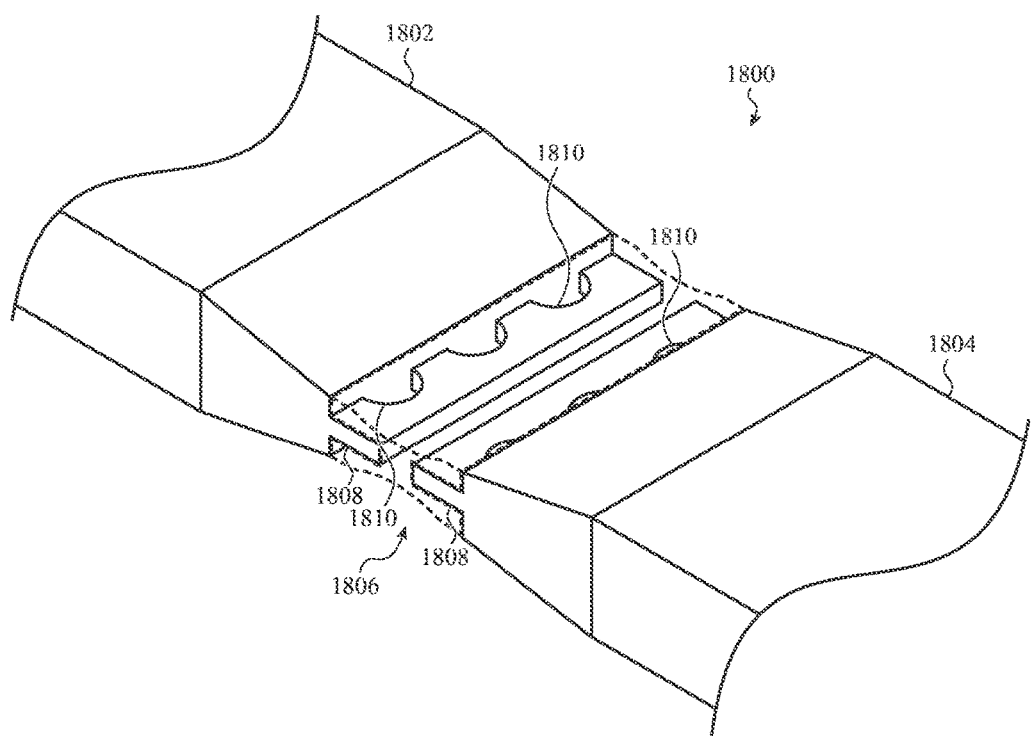

FIG. 18 shows a butterfly hinge 1800 where the wings 1802, 1804 include tongues 1808. Similar to the tongues 1708 in FIG. 17, the tongues 1808 may include openings 1810. The material of a living hinge 1806 flows or is forced into the openings 1810 during the second shot to form complementary structures in the living hinge 1806 that retain the living hinge 1806 to the wings 1802, 1804. The openings 1810 may be positioned near the bases of the tongues 1808 (e.g., where the tongues 1808 and the wings 1802, 1804 join, which may be a substantially perpendicular interface). At least a portion of one or more of the openings may be defined by a surface of the adjacent wing. In such cases, the point of engagement between a tongue 1808 and the living hinge 1806 may be closer to the base of the tongue 1808 than the configuration shown in FIG. 17. This may eliminate or reduce overhanging portions of the living hinge near the joint between the living hinge and the wings that may delaminate or decouple during use.

Figure 19:
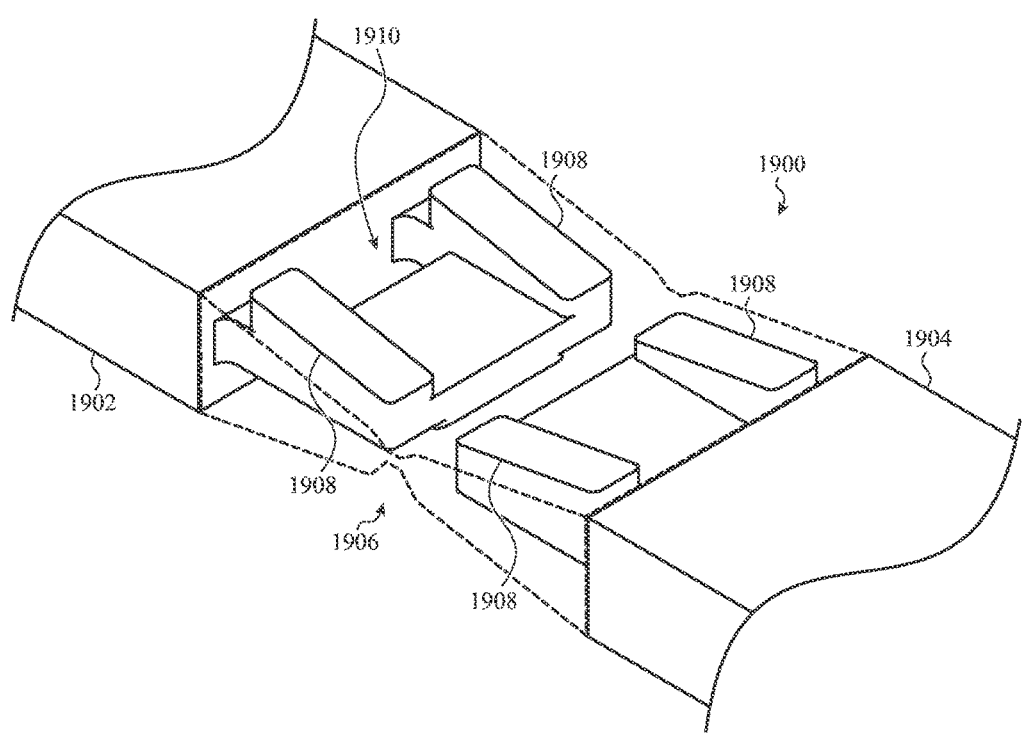

FIG. 19 shows a butterfly hinge 1900 where the wings 1902, 1904 include protrusions 1908 and openings 1910. The material of a living hinge 1906 flows or is forced around the protrusions 1908 and into the openings 1910 during the second shot to form complementary structures in the living hinge 1906 that retain the living hinge 1906 to the wings 1902, 1904. As shown, the living hinge 1906 does not fully cover the protrusions 1908, such that surfaces of the protrusions 1908 and an external surface of the living hinge 1906 form a substantially continuous surface. In other embodiments, the protrusions 1908 may be fully encapsulated or covered by the living hinge 1906.

The wings and the living hinges in the foregoing examples may be formed from or include any appropriate materials. For example, the wings may be formed from polyester, polyamide, glass filled polyamide, nylon, polycarbonate, acrylonitrile butadiene styrene, zinc, aluminum, or any other appropriate material, including metals, polymers, ceramics, etc. The living hinges may be formed from silicone, polyurethane, natural rubber, latex, or any other appropriate polymer or other material. Where the wings and the living hinges are formed from polymers, the polymers may adhere to one another (e.g., they may melt or weld together). In such cases, physical interlocking structures may be omitted from the wings. Alternatively, physical interlocking structures may be used to enhance the security of the coupling between the living hinges and the wings. Where the wings and the living hinge are not both polymers, such as where the wings are formed from a metal, the materials may not adhere significantly. Accordingly, physical interlocking structures may be used to ensure a secure coupling between dissimilar materials. For example, the butterfly hinge 1900 of FIG. 19 that includes both openings 1910 and protrusions 1908 may be suited for use with metal wings and a polymer living hinge material.

FIGS. 20A-24 illustrate butterfly hinges that may be manufactured using a double-shot injection molding process. Butterfly hinges in accordance with the instant disclosure (such as those described with reference to FIGS. 20A-24) may be manufactured using other processes as well, including co- or insert-molding. Such techniques may be used, for example, where the living hinge is formed from a material that is not suited for injection molding, including fabric, metal, and the like. In these figures, portions of the butterfly hinges are shown in broken lines to show details of internal components.

Figure 20A:
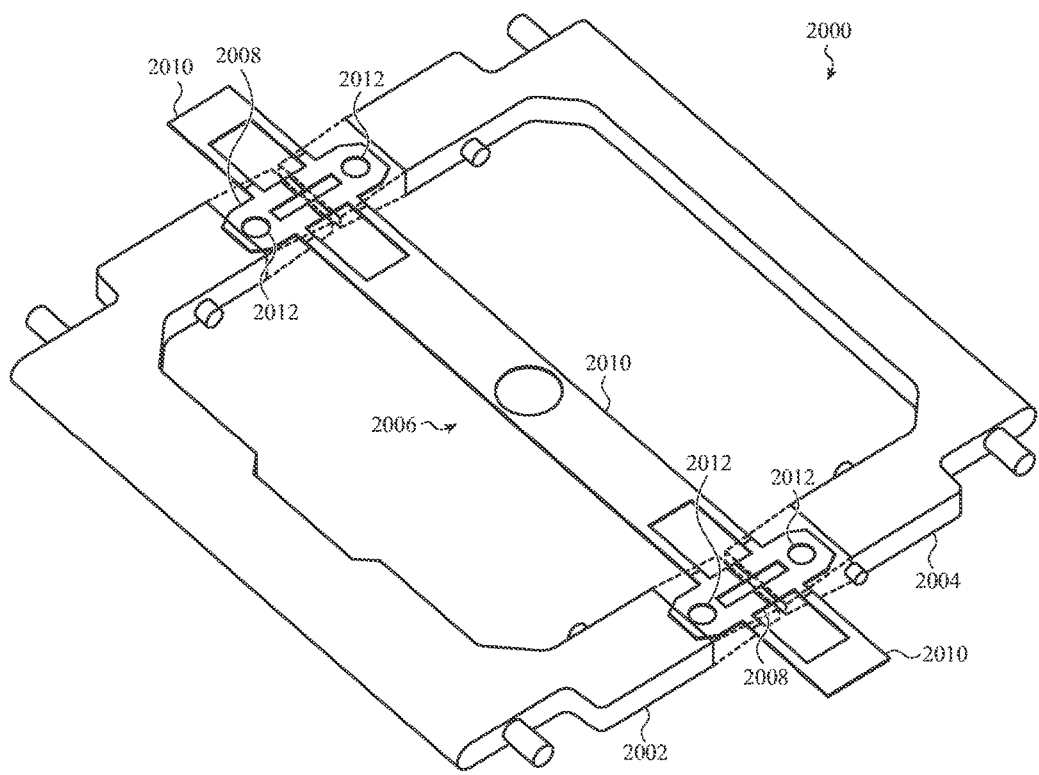

FIG. 20A shows an example butterfly hinge 2000 that may be produced by insert-molding wings 2002, 2004 around an insert 2006. The insert 2006 may include hinge portions 2008 and web portions 2010. The web portions 2010 may be used for handling and securing the insert 2006 during manufacturing of the butterfly hinge 2000. As shown in FIG. 20A, the web portions 2010 are still coupled to the hinge portions 2008, and thus illustrates the butterfly hinge 2000 in an intermediate stage of manufacture.

A method of manufacturing the butterfly hinge 2000 may include placing the insert 2006 in a mold, and thereafter injecting material into the mold to form the wings 2002, 2004 and encapsulate at least part of the insert 2006 (e.g., the hinge portion 2008) within the wings 2002, 2004. The butterfly hinge 2000 may then be ejected from the mold and the web portions 2010 of the insert may be removed from the butterfly hinge 2000 (and thus the hinge portion 2008) by laser, plasma, or water-jet cutting, or any other separating operation. The hinge portion 2008 remains at least partially encapsulated in the wings 2002, 2004 and acts as a living hinge for the butterfly hinge 2000.

The insert 2006, and in particular the hinge portion 2008 of the insert 2006, may include openings 2012 or other features that engage with the material of the wings 2002, 2004 to secure the hinge portion 2008 to the wings 2002, 2004. For example, when material is injected into the mold, the material flows through the openings, thus forming an interlocking shape that retains the hinge portion 2008 to the wings 2002, 2004. The insert 2006 may be formed from or include any appropriate material, including metals (e.g., stainless steel), composites, polymers (e.g., Vectran, para-aramid fibers, polyether ether ketone, polyimide, nylon, or fabrics formed from such materials), or any other appropriate material.

Figure 20B:
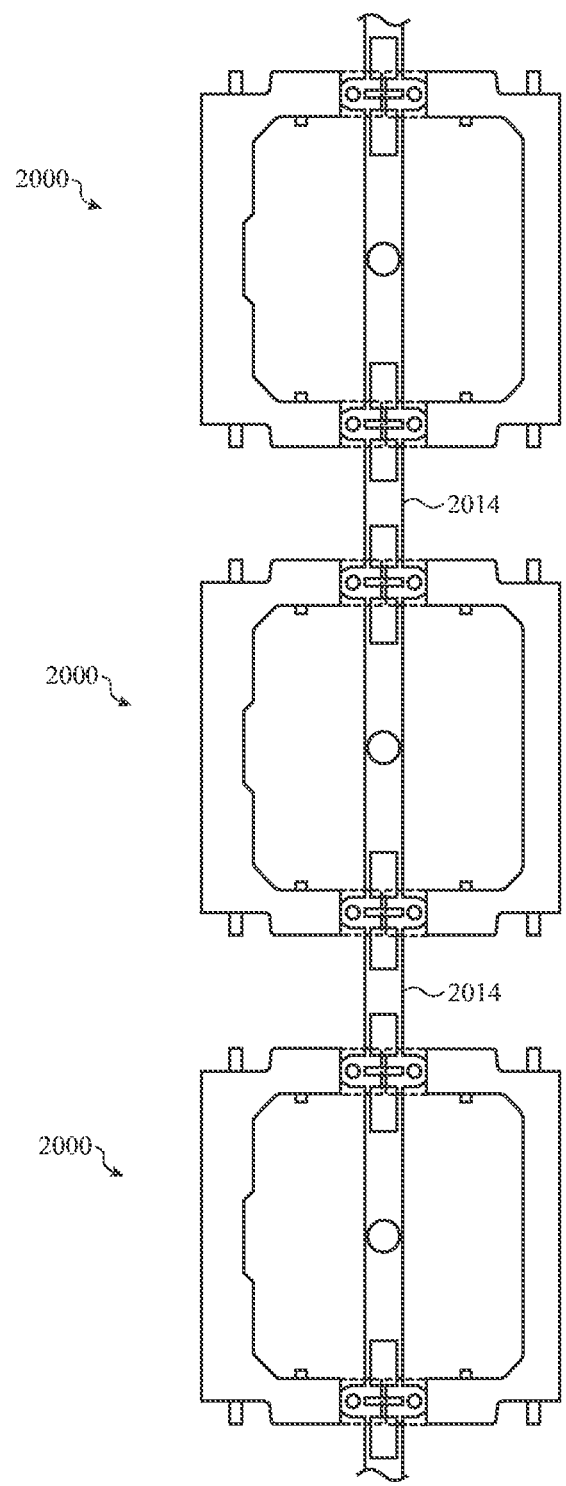

FIG. 20B shows a plurality of butterfly hinges 2000 coupled to an insert 2014 that supports multiple butterfly hinges 2000. This may increase the manufacturing speed and/or efficiency when producing multiple butterfly hinges 2000, as the butterfly hinges 2000 may be manufactured in a continuous or step-wise fashion, and can reduce setup time and other material handling costs as compared to manufacturing each butterfly hinge 2000 separately. The butterfly hinges 2000 may be separated from the insert 2014 at any appropriate time, such as immediately prior to being assembled in a keyboard. For example, strips or rolls of butterfly hinges 2000 still coupled to the insert 2014 may be fed into or supplied to a pick-and-place, tape-and-reel, or other manufacturing machine or system, which then separates individual butterfly hinges 2000 as they are needed and optionally assembles the butterfly hinges 2000 to form switch assemblies that are then coupled to a keyboard base plate.

Figure 21:
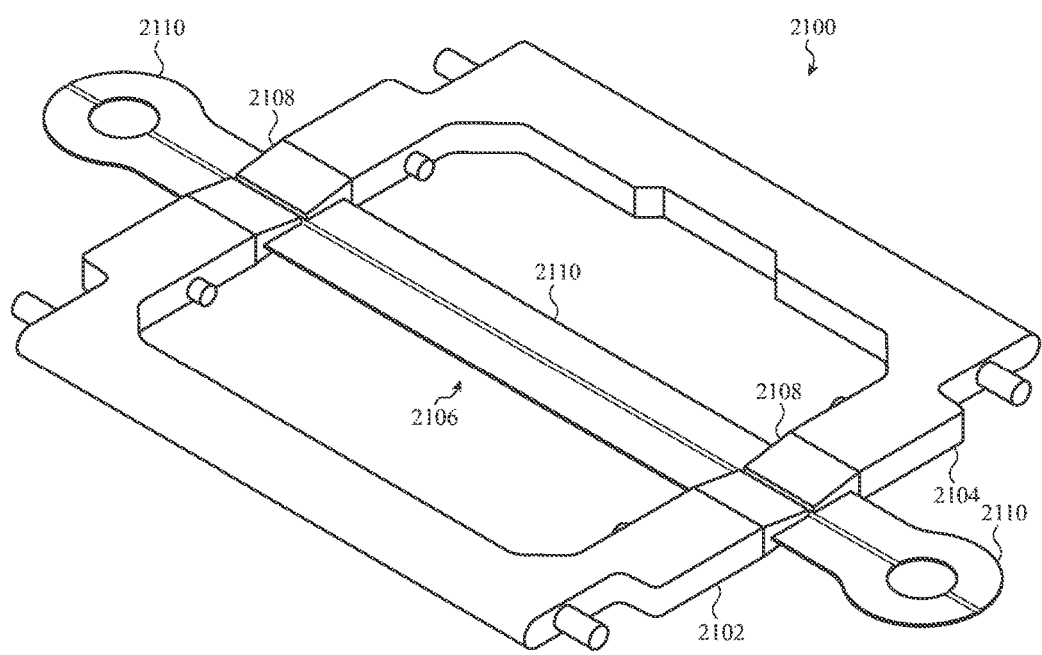

FIG. 21 shows an example butterfly hinge 2100 that may be produced by insert molding wings 2102, 2104 around an insert 2106. The insert 2106, which may be formed from fabric, metal, or any other appropriate material, may include hinge portions 2108 and web portions 2110. The web portions 2110 may be used for handling and securing the insert 2106 during manufacturing of the butterfly hinge 2100. As shown in FIG. 21, the web portions 2110 are still coupled to the hinge portions 2108, and thus illustrates the butterfly hinge 2100 in an intermediate stage of manufacture. The web portions 2110 may be removed before the butterfly hinge 2100 is incorporated into a keyboard, as described above.

Figure 22:
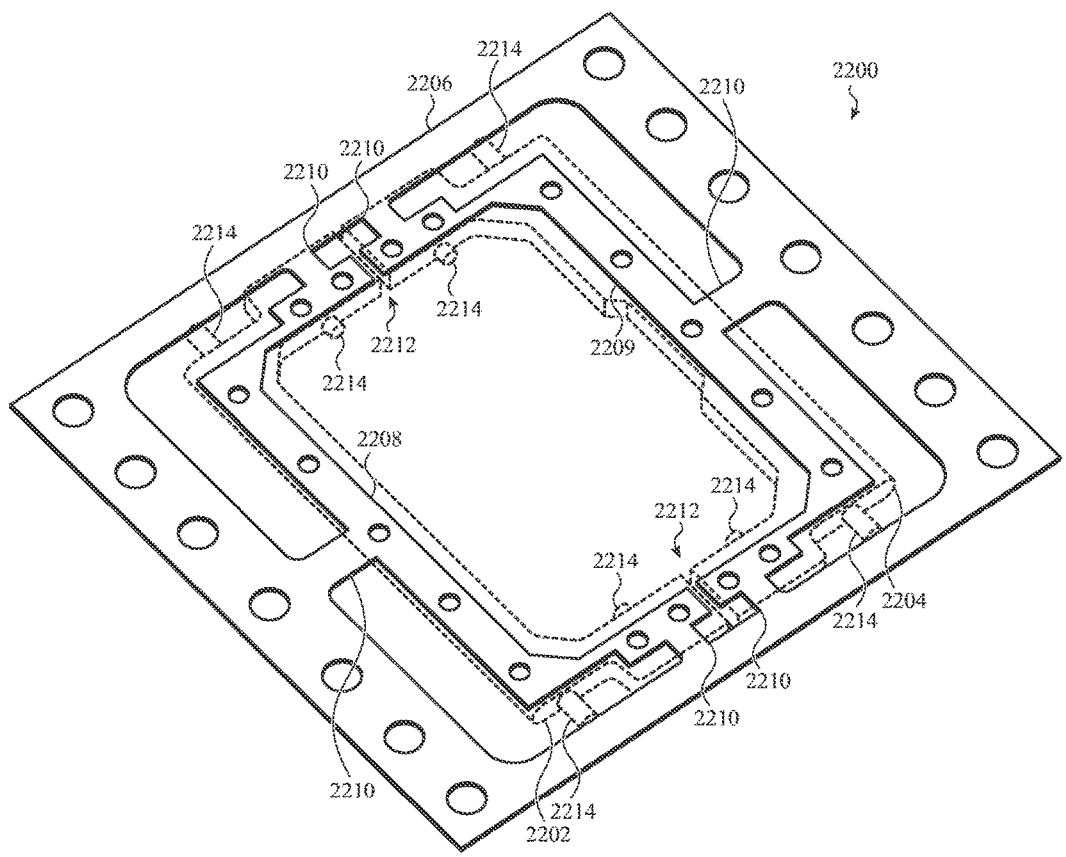
Figure 23:
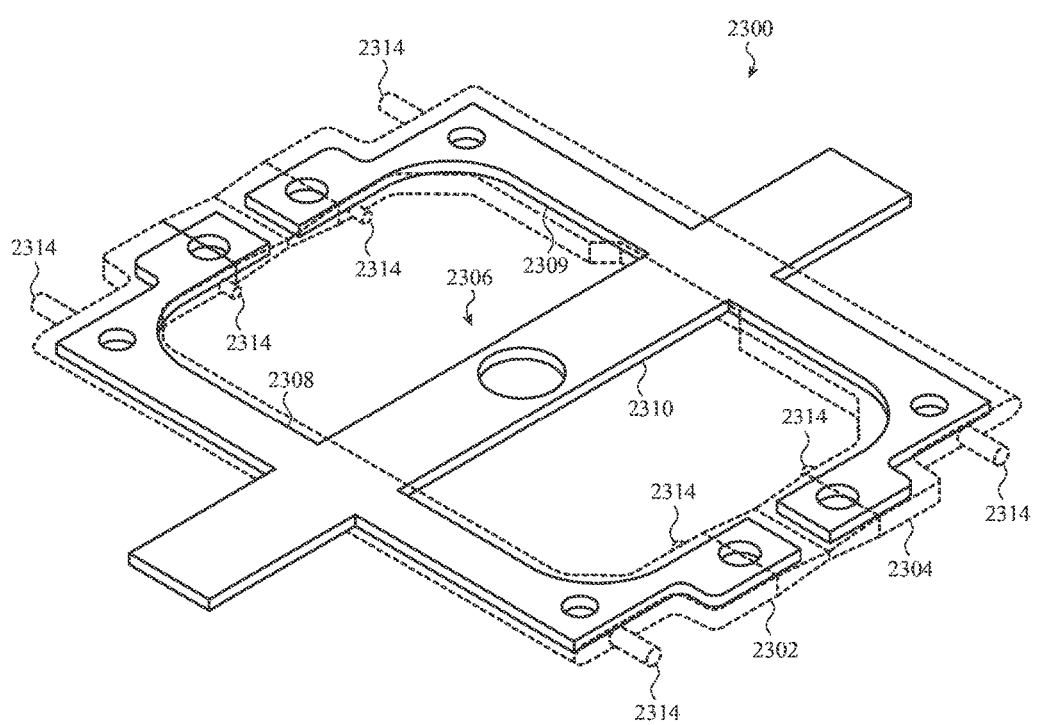
Figure 24:
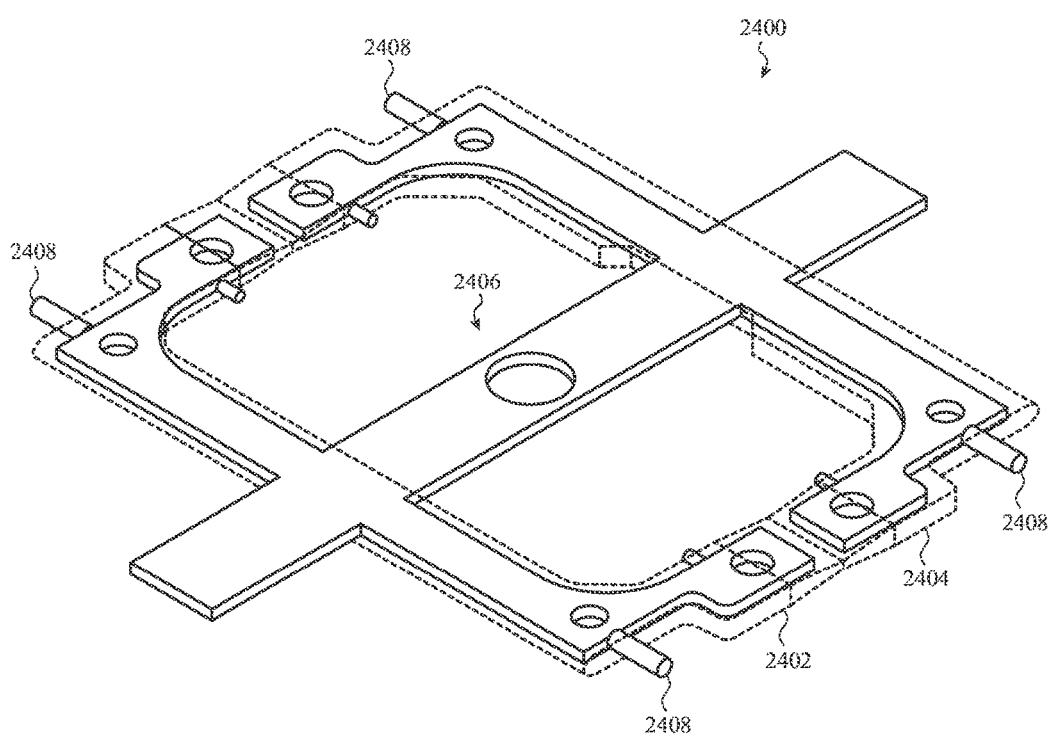

FIGS. 20A-21 illustrate butterfly hinges where the insert forms the living hinge. FIGS. 22-24 show butterfly hinges where material is molded over and/or around an insert that forms an internal frame or structure for the wings, and the wing material forms the living hinge. For example, FIG. 22 shows a butterfly hinge 2200 that may be produced by insert molding wings 2202, 2204 around an insert 2206. The insert 2206 may include frame portions 2208, 2209 and web portions 2210. The frame portions 2208, 2209 may form an internal frame or support structure for the wings 2202, 2204. The wings 2202, 2204 form a unitary, monolithic structure that includes living hinge portions 2212 joining the first wing 2202 to the second wing 2204. Once the web portions 2210 are removed from the insert 2206, the frame portions 2208, 2209 may not contact one another (e.g., they do not extend through the living hinge portion 2212).

FIG. 23 shows a butterfly hinge 2300 that may be produced by insert molding wings 2302, 2304 around an insert 2306. The insert 2306 may include frame portions 2308, 2309, and web portions 2310. The frame portions 2308, 2309 may be similar in shape and function to the frame portions 2208, 2209 (FIG. 22), but the web potions 2310 may have a different configuration that the web portions 2210. For example, instead of substantially surrounding the butterfly hinge as shown in FIG. 22, the web portions 2310 extend through a central region of the butterfly hinge 2300.

In FIGS. 22-23, external features of the butterfly hinges 2200, 2300 are formed from the wing material. For example, pins 2214, 2314 (FIGS. 22, 23, respectively) may be formed from the wing material during the molding of the wings. In some cases, some or all of the pins (or other external features of the butterfly hinges) may be part of or extend from the insert around which the wings are molded. For example, FIG. 24 shows a butterfly hinge 2400 that may be produced by insert molding wings 2402, 2404 around an insert 2406, where pins 2408 extend beyond the external surface of the wings 2402, 2404. In other functional and/or structural respects, the butterfly hinge 2400 may be the same as the butterfly hinge 2300 (FIG. 23).

Figure 25:
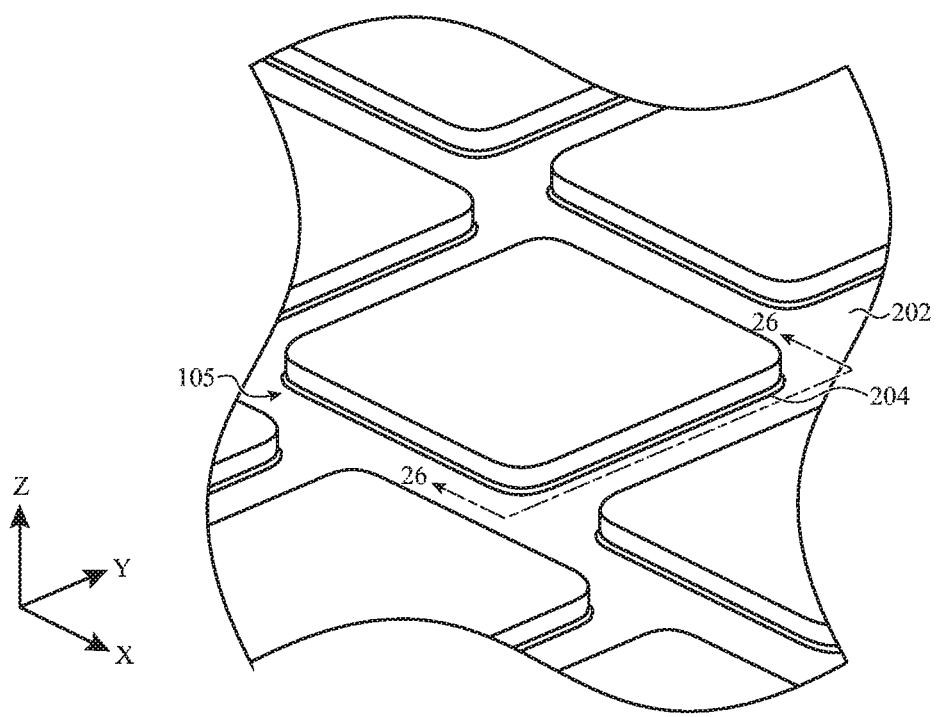
FIG. 25 shows the key of FIG. 3.

The butterfly hinges described herein (e.g., the butterfly hinge 304) are configured to movably support a keycap (e.g., a keycap 204) relative to a keyboard base (e.g., the base plate 208). FIG. 25 illustrates the key 105 of the keyboard 102 (FIG. 1), which includes the keycap 204 positioned in an opening in a web 202 and a butterfly hinge 304 (not visible in FIG. 25) movably supporting the keycap 204 relative to the keyboard base. When the key 105 is actuated, the keycap 204 moves towards the keyboard base (e.g., along the z-axis, as illustrated in FIG. 25) in order to actuate a switch or dome underneath the keycap 204. Due to the geometry of the butterfly hinge 304, as well as the orientation of the butterfly hinge with respect to the keycap 204, the keycap 204 may also translate laterally along a direction that is substantially in-plane with the keycap 204 (e.g., along the x- or y-axis). For example, as described herein, the butterfly hinge 304 may cause the keycap 204 to travel along an arced path as it is pressed downward, which may result in at least one side of the keycap 204 moving closer to the web 202. This may cause the keycap 204 to ultimately contact the web 202, which may cause binding, scraping, or other undesirable interactions. Also, while one side of the keycap 204 may move close to the web 202, an opposite side of the keycap 204 may move further away from the web 202, resulting in a gap that may allow debris or other contaminants to fall under the keycap 204. FIGS. 26A-30B show various embodiments of butterfly hinges and other components that may provide different degrees of lateral movement of the keycap 204 during actuation of the key 105. FIGS. 26A-29B generally correspond to a cross-sectional view of the key 105 viewed along line 26-26 in FIG. 25, though some components and features are omitted for clarity, and some components that would not necessarily be visible in cross-section are shown in phantom lines to better depict the mechanism. Moreover, it will be understood that the key 105 may be substantially symmetrical such that the components and features described with respect to FIGS. 26A-29B may be substantially replicated on an opposite side of the key 105.

Figure 26A:
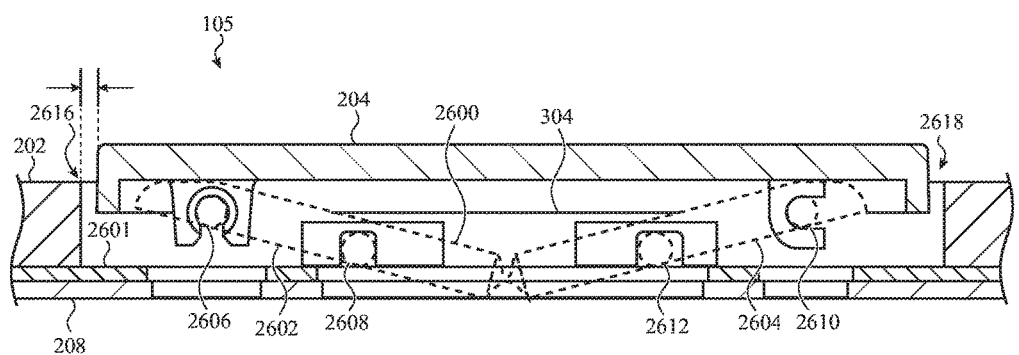
FIGS. 26A-29B show partial cross-sectional views of the key of FIG. 3 viewed along line 26-26 in FIG. 25.
Figure 26B:
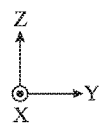
Figure 26B:
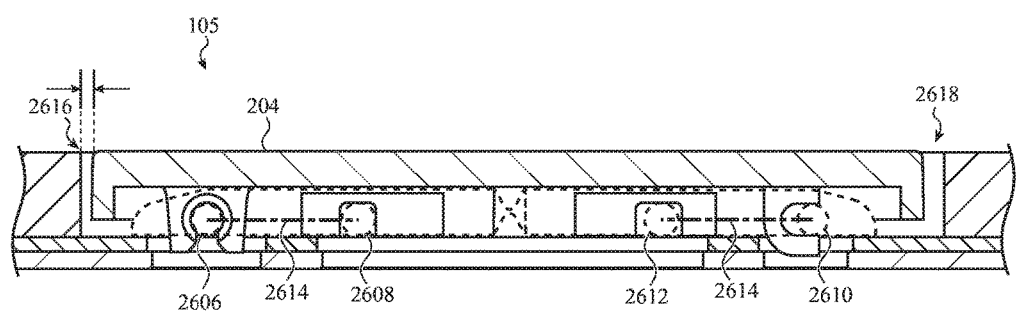

FIGS. 26A-26B show one example of the key 105 in an unactuated and an actuated state, respectively. The key 105 includes a butterfly hinge 2600 with a first wing 2602 and a second wing 2604. The butterfly hinge 2600 may correspond to or be an example embodiment of the butterfly hinge 304. The first wing 2602 includes a keycap pivot pin 2606 coupled to the keycap and a base pivot pin 2608 coupled to a dome support structure 314 (or any other appropriate component), and the second wing 2604 includes a keycap pivot pin 2610 coupled to the keycap and a base pivot pin 2612 coupled to the dome support structure (or any other appropriate component). The keycap and base pivot pins 2606, 2608 may be translationally constrained to the keycap 204 and the dome support structure, respectively (e.g., they can rotate but cannot slide relative to the keycap 204 and the dome support structure 314). The keycap and base pivot pins 2610, 2612 of the second wing 2604, on the other hand, may be free to rotate and slide or translate relative to the keycap 204 and the dome support structure 314 at least enough to prevent binding and allow the keycap 204 to move downward during actuation. For example, the channel of the dome support structure 314 in which the base pivot pin 2612 is positioned may be wider than the base pivot pin 2612, and also wider than the channel in which the base pivot pin 2608 is coupled, thus allowing the base pivot pin 2612 to translate as well as rotate within the channel. The pivot pins of the butterfly hinge 2600 (and indeed any of the butterfly hinges described herein) may be substantially the same size (e.g., length, diameter) and shape as one another. The pivot pins are one example of pivot members that may be used. Other suitable pivot members may include rods, posts, protrusions, arms, etc.

The wings 2602, 2604 may be configured so that, when the key 105 reaches the end of its travel in an actuated state (e.g., when the key 105 is depressed), the keycap and base pivot pins on each wing are aligned along a line 2614 that is parallel to a plane defined by the base plate 208 (and/or a membrane or other layer 2601 positioned over the base plate 208). This configuration may result in the keycap 204 shifting a certain amount in the negative y-direction. For example, a gap 2616 between the keycap 204 and the web 202 may decrease as shown in FIGS. 26A and 26B. A gap 2618 on the opposite side of the keycap 204 may increase by a corresponding amount.

Figure 27A:
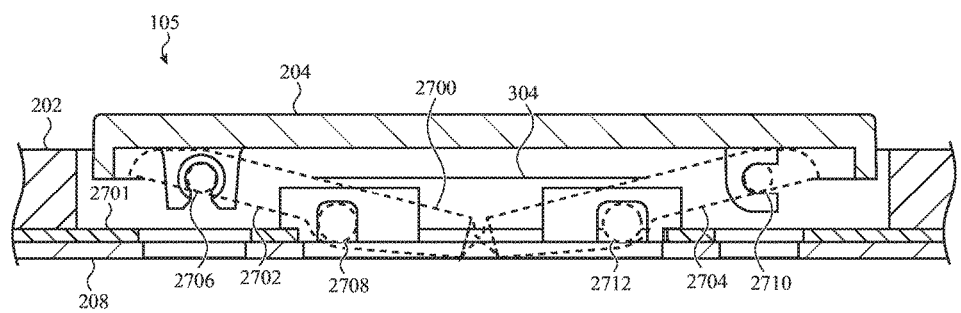
Figure 27B:
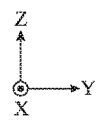
Figure 27B:
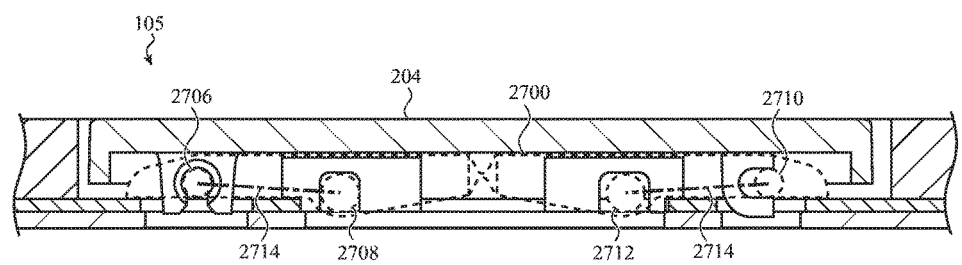

FIGS. 27A-27B show another example of the key 105 in an unactuated and an actuated state, respectively. While similar to the butterfly hinge 2600 described with respect to FIGS. 26A-26B, the butterfly hinge 2700 shown in FIGS. 27A-27B (which may correspond to or be an embodiment of the butterfly hinge 304) results in a different alignment of the pivot pins in the actuated state. In particular, the butterfly hinge 2700 includes a first wing 2702 and a second wing 2704. The first wing 2702 includes a keycap pivot pin 2706 coupled to the keycap and a base pivot pin 2708 coupled to a dome support structure 314 (or any other appropriate component), and the second wing 2704 includes a keycap pivot pin 2710 coupled to the keycap and a base pivot pin 2712 coupled to the dome support structure (or any other appropriate component). The keycap and base pivot pins 2706, 2708 may be translationally constrained to the keycap 204 and the dome support structure, and the keycap and base pivot pins 2710, 2712 of the second wing 2704 may be free to rotate and slide (or otherwise translate) relative to the keycap 204 and the dome support structure 314, as described above.

The wings 2702, 2704 may be configured so that, when the key 105 reaches the end of its travel in an actuated state (e.g., when the key 105 is depressed), the keycap and base pivot pins on each wing are aligned along a line 2714 that is not parallel to a plane defined by the base plate 208 and/or a membrane 2701. This configuration may result in the keycap 204 shifting in the negative y-direction a different amount (e.g., less than) the shift exhibited by the butterfly hinge 2600 in FIG. 26. The non-parallel alignment of the pivot pins may be achieved by positioning the base pivot pins 2708, 2712 in an opening or gap in a membrane 2701 or other layer that is positioned above the base plate 208 (or otherwise configuring the key 105 so that the base pivot pins 2708, 2712 are lower than the keycap pivot pins 2706, 2710 when the key is actuated). In FIGS. 26A-26B, on the other hand, when the key 105 is actuated, both the keycap and the base pivot pins are positioned on top of the membrane 2701 such that their central axes are parallel to the base plate 208. By sinking the base pivot pins 2708, 2712 below the top surface of the membrane 2701, the keycap 204 may translate a different amount along the y-axis during actuation than other configurations.

Figure 28A:
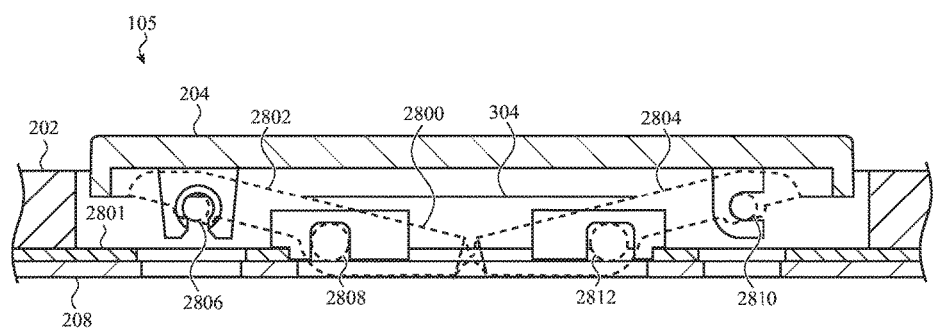
Figure 28B:
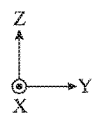
Figure 28B:
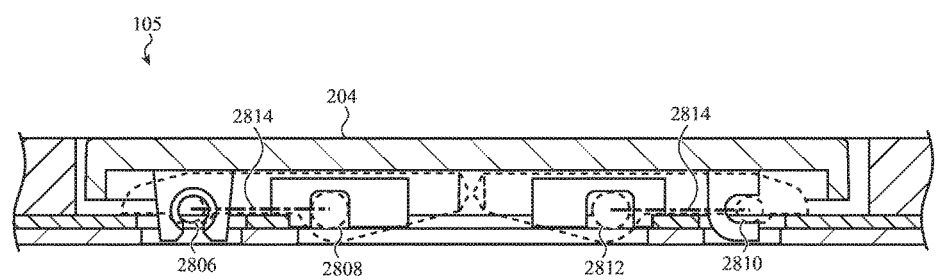

FIGS. 28A-28B show another example of the key 105 in an unactuated and an actuated state, respectively. While similar to the butterfly hinges 2600 and 2700, the butterfly hinge 2800 shown in FIGS. 28A-28B (which may correspond to or be an embodiment of the butterfly hinge 304) results in a different alignment of the pivot pins in the actuated state. In particular, the butterfly hinge 2800 includes a first wing 2802 and a second wing 2804. The first wing 2802 includes a keycap pivot pin 2806 coupled to the keycap and a base pivot pin 2808 coupled to a dome support structure 314 (or any other appropriate component), and the second wing 2804 includes a keycap pivot pin 2810 coupled to the keycap and a base pivot pin 2812 coupled to the dome support structure (or any other appropriate component). The keycap and base pivot pins 2806, 2808 may be translationally constrained to the keycap 204 and the dome support structure, and the keycap and base pivot pins 2810, 2812 of the second wing 2804 may be free to rotate and slide relative to the keycap 204 and the dome support structure 314, as described above.

The wings 2802, 2804 may be configured so that, when the key 105 reaches the end of its travel in an actuated state (e.g., when the key 105 is depressed), the keycap and base pivot pins on each wing are aligned along a line 2814 that is parallel to a plane defined by the base plate 208 and/or a membrane 2801, but is closer to the base plate 208 than the mechanism shown in FIGS. 26A-26B. This alignment of the pivot pins may be achieved by configuring the key mechanism 105 so that at least part of the base pivot pins 2808, 2812 and the keycap pivot pins 2806, 2810 extend below a top surface of a membrane 2801 (or below a top surface of the base plate 208) when the key 105 is actuated.

Figure 29A:
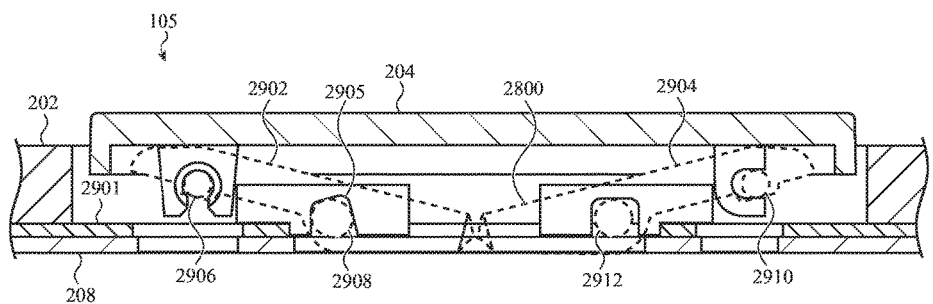
Figure 29B:
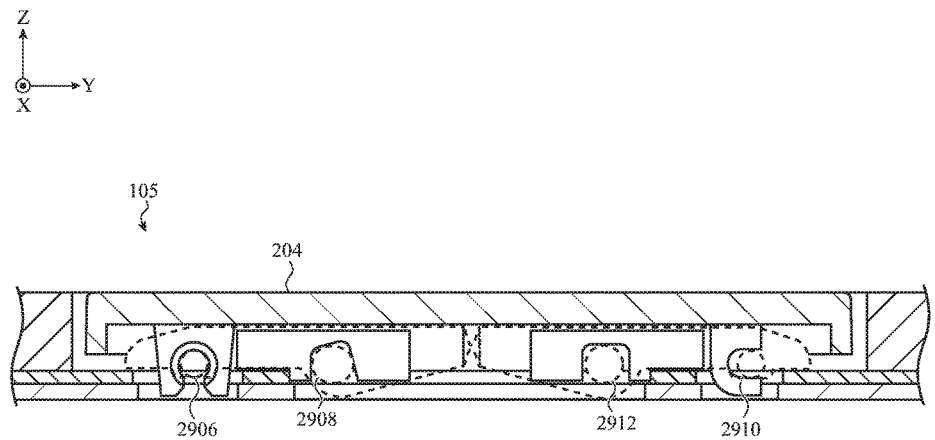

FIGS. 29A-29B show another example of the key 105 in an unactuated and an actuated state, respectively. FIGS. 29A-29B show a butterfly hinge 2900 that includes a first wing 2902 and a second wing 2904. The first wing 2902 includes a keycap pivot pin 2906 coupled to the keycap and a base pivot pin 2908 coupled to a dome support structure 314 (or any other appropriate component), and the second wing 2904 includes a keycap pivot pin 2910 coupled to the keycap and a base pivot pin 2912 coupled to the dome support structure (or any other appropriate component). The keycap and base pivot pins 2910, 2912 of the second wing 2904 may be free to rotate and slide relative to the keycap 204 and the dome support structure 314, as described above.

Instead of a simple rotating pivot, the base pivot pin 2908 may have a non-circular or cam profile that causes the keycap 204 to travel through a path that is different than what is achieved with a simple rotating pivot, such as those shown in FIGS. 26A-28B. Additionally, the channel 2905 in which the base pivot pin 2908 is positioned may have a non-circular shape that interacts with the non-circular or cam profile of the base pivot pin 2908 to produce a desired travel path of the keycap 204. The shapes and positions of these components may result in less lateral motion of the keycap 204 during actuation of the key 105 than may be achieved with other designs, including designs using simple rotating pivots.

Figure 30A:
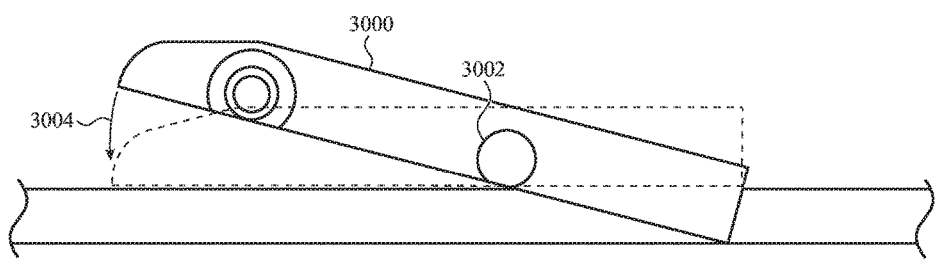
FIGS. 30A-30B show schematic views of butterfly hinges for use in the key of FIG. 3.
Figure 30B:
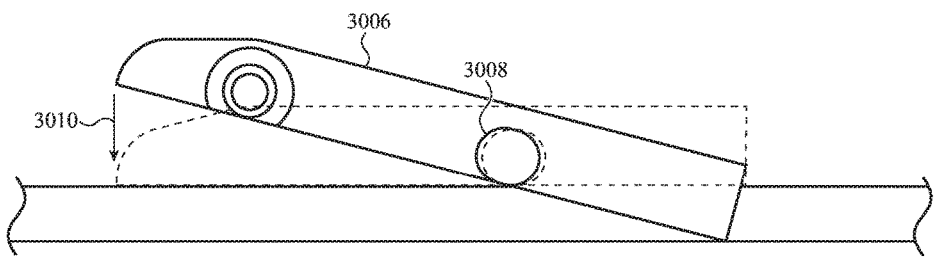

FIG. 30A shows a schematic view of an arm 3000 of a butterfly hinge that has a simple rotating base pivot pin 3002. When the arm 3000 moves from the unactuated state (shown in solid lines) to the actuated state (shown in dashed lines), the end of the arm 3000 moves through a substantially circular arc 3004. FIG. 30B shows a schematic view of an arm 3006 of a butterfly hinge that has a base pivot pin 3008 with a non-circular or cam profile, such as the base pivot pin 2908 in FIG. 29. When the arm 3006 moves from the unactuated state (shown in solid lines) to the actuated state (shown in dashed lines), the end of the arm 3006 moves through an arc 3010. The arc 3010 may result in substantially less lateral translation (e.g., along the y-axis) than the circular arc 3004, which in turn may result in less lateral translation of a keycap 204. In some cases, the arc 3010 may be substantially linear.

Figure 31:
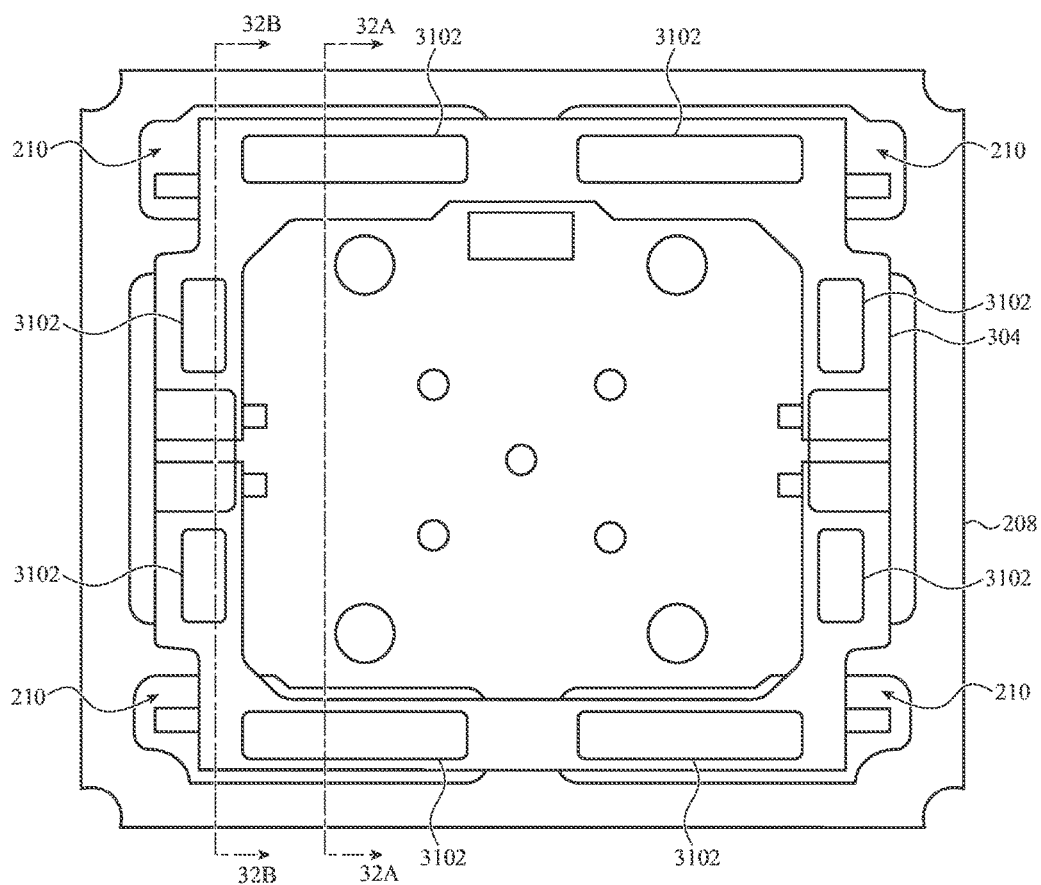
FIG. 31 shows a partial view of the key of FIG. 3.
Figure 32A:
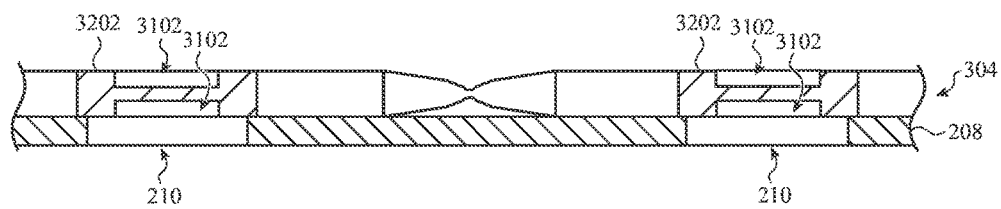
FIG. 32A shows a partial cross-sectional view of the key of FIG. 3 viewed along line 32A-32A in FIG. 31.
Figure 32B:
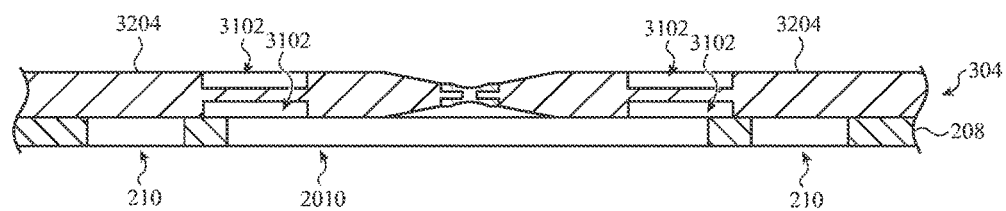
FIG. 32B shows a partial cross-sectional view of the key of FIG. 3 viewed along line 32B-32B in FIG. 31.

FIG. 31 shows a butterfly hinge 304 of a representative key 105 positioned on the base plate 208. As noted above, the base plate 208 may define a plurality of openings 210 that may, among other functions, provide clearance underneath components of the keys to provide a space for debris to accumulate without causing binding and/or other interference with the motion of the key. FIG. 31 also shows recesses 3102 that may be formed in the butterfly hinge 304 to provide additional clearance between the butterfly hinge 304 and the base plate 208, or other nearby components. FIGS. 32A-32B show cross-sectional views of the butterfly hinge 304 and the base plate 208 viewed along lines 32A-32A and 32B-32B, respectively, in FIG. 31.

As shown in FIG. 32A, an opening 210 is positioned below cross-beams 3202 of the butterfly hinge 304 when the butterfly hinge 304 is in an actuated state (e.g., corresponding to a key 105 being depressed). Similarly, as shown in FIG. 32B, an opening 210 is positioned below arm portions 3204 of the butterfly hinge 304 when the butterfly hinge 304 is in an actuated state. If the base plate 208 were continuous under these portions of the butterfly hinge 304, a piece of debris, such as sand, crumbs, dust, or the like, may interfere with the movement of the butterfly hinge 304 during actuation of the key 105. By providing the openings in the positions shown, sufficient clearance may exist to allow the key 105 to continue to operate despite the presence of debris or other contaminants. In some cases, the openings 210 and the butterfly hinge 304 is configured such that 50% or more (e.g., up to 90%) of the surface of the butterfly hinge 304 that faces the base plate 208 does not contact the base plate 208 when the key 105 is actuated.

FIGS. 32A-32B also show the recesses 3102 that may provide additional clearance between the butterfly hinge 304 and adjacent components. The recesses 3102 may be any appropriate depth or shape, and may be positioned in any appropriate location on the butterfly hinge. As shown, the butterfly hinge 304 includes recesses 3102 on both top and bottom surfaces, providing clearance between the butterfly hinge 304 and the base plate 208 as well as a keycap 204 (not shown in FIGS. 32A-32B).

Figure 33:
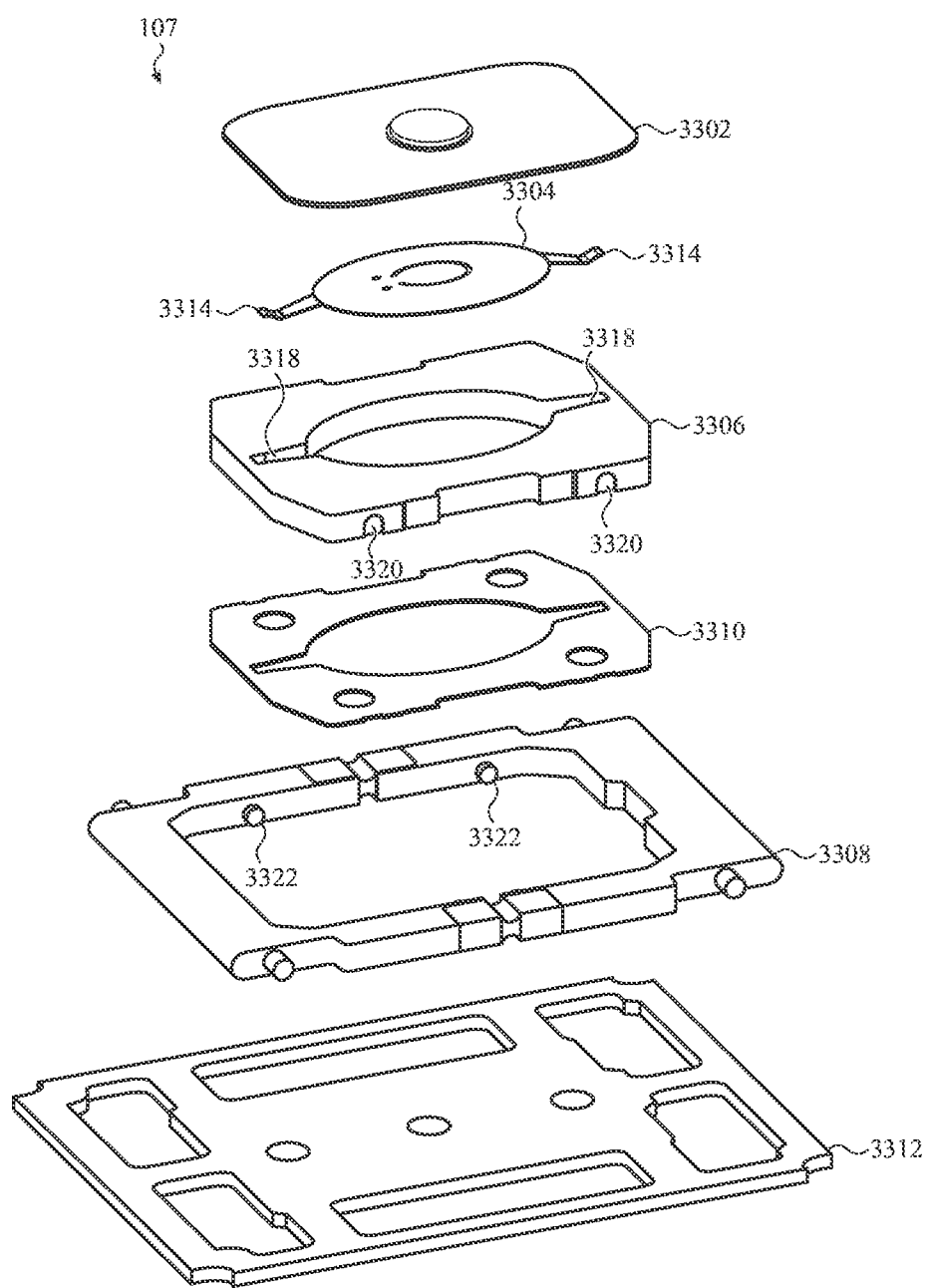
FIG. 33 shows an exploded view of an example key.

The representative key 105 discussed with respect to the foregoing figures is one representative key of a keyboard. However, not all keys on a keyboard are necessarily identical. For example, different keys may have different stroke lengths, tactile responses, keycap sizes, keycap shapes, keycap aspect ratios, and the like. For example, a space bar, shift key, or return key of a keyboard may be wider than a typical letter key. In such cases, some or all of the components of a corresponding switch assembly may be enlarged in order to provide suitable mechanical and/or electrical functionality to the key. As one example, for a shift key, the butterfly hinge 304 may be elongated in the same manner as the keycap in order to adequately support the keycap. Alternatively, multiple butterfly hinges, each the same size as one from a corresponding letter key, may be used (e.g., one butterfly hinge at each end of the space bar. Each key may include only one dome, however. For example, where multiple butterfly hinges are used for a single key, a single dome may be positioned between the two butterfly hinges such that a central portion of the keycap actuates the dome.

Where a key is smaller than a typical letter key of the keyboard, such as for a "function row" (e.g., a set of keys above the standard alphanumeric keys of an English keyboard that typically control one or more functions of a device apart from text or data entry), any or all of the components of a corresponding switch assembly may be smaller than those of a typical letter key. FIG. 33 shows an exploded view of an example key 107 that may be used for keys with a smaller keycap or a different aspect ratio than the key 105. The key 107 includes a cover member 3302, a dome 3304, a dome support structure 3306, an actuation mechanism 3308 (e.g., a butterfly hinge or other hinge mechanism), an adhesive 3310, and a base 3312 (e.g., the base plate 208 or a portion thereof). Each of these components may provide the same or similar function as the corresponding components of the key 105, but may be sized or shaped to accommodate the different sized keycap.

In some cases where the key 107 is smaller than the key 105, the dome 3304 may have a different configuration than the dome 402. For example, instead of having a generally circular dome portion with four retention features 406 extending from an outer edge of the dome, the dome 3304 may have an oblong dome portion with two retention features 3314 extending from opposite ends of the dome 3304. The dome support structure 3306 may define an opening 3316 having a shape that generally corresponds to the dome 3304. The dome support structure 3306 may also include retention surfaces 3318 that engage the retention features 3314 to retain the dome 3304 in the opening. The retention features 3314, retention surfaces 3318, and the cover member 3302 may provide substantially the same functionality as the corresponding components of the key 105 (e.g., retaining the dome 3304 to the dome support structure 3306 to aid in manufacturing and/or assembly of a keyboard). Similarly, the dome support structure 3306 may define channels 3320 that are configured to engage pivot pins 3322 of the actuation mechanism 3308 in the same or similar manner as in the key 105.

Figure 34:
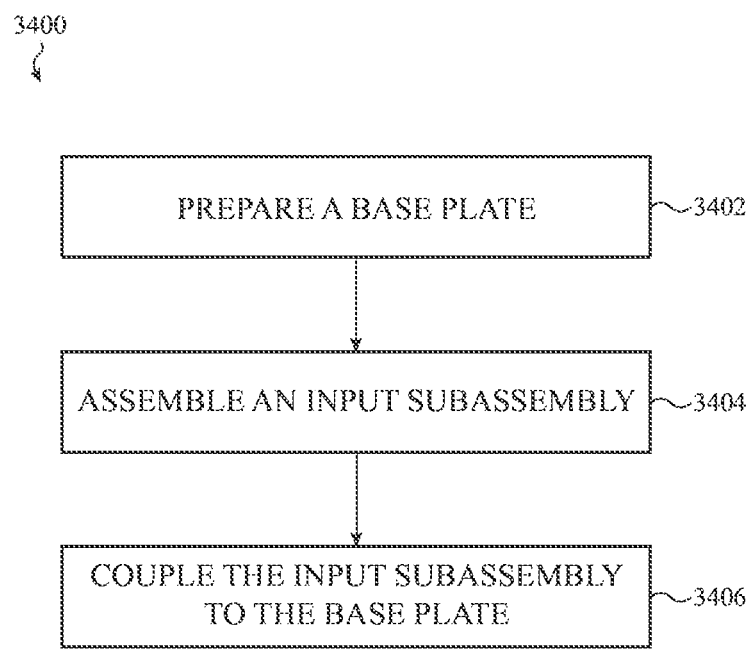
FIG. 34 shows a flow chart of an example method of assembling a keyboard.

FIG. 34 shows a flow chart of an example method 3400 for assembling a keyboard, such as the keyboard 102, described above. The method 3400 may be implemented all or in part by pick-and-place machines, tape-and-reel machines, SMT machines, or any other component placement machines or apparatuses. As described above, the use of such machines may be facilitated or enabled by components that can be assembled by machines into self-contained, modular subassemblies and that are designed to self-align with each other during assembly.

At operation 3402, a keyboard base plate is prepared. The base plate may be the base plate 208, or any other appropriate keyboard base plate or substrate. The base plate may be any appropriate material or component, such as a printed circuit board, a flexible circuit board, or the like. Preparing the base plate may include heat treating and/or curing the base plate. For example, the base plate may be heated to dry and/or cure the base plate until it becomes dimensionally stable. Performing the heat treating and/or curing operation at this stage may help prevent detrimental dimensional changes later during the keyboard assembly process. For example, components may be heat staked or soldered to the base plate. If the base plate is not dimensionally stable prior to such operations, the heat from such operations may cause the base plate to shrink, expand, warp, or otherwise change shape. Accordingly, heat treating and/or curing the base plate prior to other assembly steps may help maintain the dimensional stability of the base plate during later assembly phases.

Preparing the base plate may also include forming conductive paths or traces (including, for example, the electrical contacts 418, 420, FIG. 4) on the base plate. Such paths or traces may be formed in any appropriate way, including photolithography, applying wires to the base plate, or the like. Preparing the base plate may also include forming openings such as the openings 210 (FIG. 2) and 424 (FIG. 4) in the base plate. Such openings may be formed by drilling, machining, laser cutting, water jet cutting, or any other suitable operation.

At operation 3404, an input subassembly is assembled. Assembling the input subassembly (which may correspond to a switch assembly 206, FIG. 2) may include positioning a collapsible dome (e.g., the dome 402, FIG. 4) in an opening of a dome support structure (e.g., the dome support structure 314, FIG. 3) to engage the collapsible dome with the dome support structure. For example, the collapsible dome may be positioned in an opening of the dome support structure such that suspension arms or other retention features of the dome are positioned in recesses in the dome support structure such that the suspension arms or retention features overlap retention surfaces of the dome support structure.

Assembling the input subassembly (operation 3404) may also include coupling a cover member (e.g., the cover member 316, FIG. 3) to the dome support structure such that the collapsible dome is retained between the cover member and a retention surface of the dome support structure. For example, a cover member may be glued, welded (e.g., laser welded, ultrasonically welded), or otherwise bonded to the dome support structure. Because of the cover member and the overlap between the dome's suspension arms and the dome support structure's retention surfaces, the dome, input subassembly, and cover member form a modular, self-contained switch package. For example, the dome is retained within the opening of the dome support structure such that the switch package can be moved or otherwise manipulated without becoming disassembled. Moreover, because the dome is secured in a supporting component (the dome support structure), aspects of the switch package can be tested in an assembly-ready configuration. That is, the actual switch package that is intended to be included in a keyboard can be tested to detect any defects prior to being incorporated into a keyboard. In contrast, where each individual component is separately coupled to a keyboard base plate during assembly, it may not be possible (or it may be more difficult or less efficient) to test the operation of certain components prior to assembly. As one example, where components must be separately assembled to a keyboard base, it may be difficult to ensure proper engagement between a dome and a dome support structure until after they are both coupled to the base plate, at which time removal and repair may be difficult, time consuming, costly, or otherwise not practical.

The operation 3404 of assembling the input subassembly may include coupling a butterfly hinge (e.g., the butterfly hinge 304) to the dome support structure. For example, the dome support structure may include retention channels, and the butterfly hinge may include pivot pins. Accordingly, coupling the butterfly hinge may include capturing a pivot pin (or a plurality of pivot pins) of the butterfly hinge in a retention channel (or a plurality of retention channels) of the dome support structure. Examples of retention channels and pivot pins, and various examples of their shapes and interactions, are described herein. The butterfly hinge may be coupled to the dome support structure prior to the operation 3406 (below) of coupling the input subassembly to the base plate.

At operation 3406, the input subassembly is coupled to a base plate. The input subassembly, which may include the dome, dome support structure, cover member, and butterfly hinge, may be coupled to the base plate in any appropriate manner. For example, clips, pins, posts, or other members of the dome support structure may be inserted into openings in the base plate to retain the dome support structure (and thus the whole input subassembly) to the base plate. The members that are inserted into the openings may be heat staked to the base plate, or may otherwise mechanically engage with the base plate. Additionally or alternatively, the dome support structure may be adhered to the base plate. For example, an adhesive, such as a pressure sensitive adhesive, heat sensitive adhesive, or any other adhesive or bonding agent, may be applied to one or both of the dome support structure and the base plate, and the dome support structure may be assembled to the base plate to form a bond therebetween.

Coupling the input subassembly to the base plate at operation 3406 may result in the pivot pin (or pins) of the butterfly hinge being retained between a wall of the retention channel (or channels) and the base plate. That is, the pivot pins are captured in the channel by the walls of the channel as well as a surface of the base plate. As described herein, capturing the pivot pins in this way retains the butterfly hinge to the keyboard while also facilitating pick-and-place assembly techniques.

Coupling the input subassembly to the base plate at operation 3406 may also result in the collapsible dome forming an electrical connection with an electrical contact on the base plate. For example, the configuration of the input subassembly and the base plate may be such that when the input subassembly is coupled to the base plate, the collapsible dome, which is retained to the dome support structure, is properly positioned relative to electrical contacts on the base plate (e.g., the electrical contacts 418, 420, FIG. 4). Moreover, the collapsible dome and the dome support structure may be configured such that, when coupled to the base plate, a portion of the collapsible dome is biased against the electrical contacts. More particularly, the cover member may bias the dome towards the base plate such that one or more suspension arms (e.g., suspension arms 904, FIG. 9) are pressed against electrical contacts with sufficient force to maintain a positive electrical contact between the dome and the electrical contacts during use of the keyboard.

The electrical contact between the dome and the electrical contacts of the base plate may be formed without soldering the dome to the electrical contacts. Indeed, in some cases, it is not necessary to solder or otherwise fuse the dome to the keyboard, and the electrical contact may be maintained solely by mechanical force. In some embodiments, a soldering or other fusing operation is used to form the electrical connection. For example, solder balls may be included on one or both of the suspension arms and the electrical contacts, and a reflow operation may be performed after one or more of the switch subassemblies are coupled to the base plate to fuse the domes to the electrical contacts.

As described herein, the components described herein facilitate assembly using pick-and-place or SMT assembly technology, and various operations of the method 3400 may be performed using such machines. For example, the operation of coupling the butterfly hinge to the dome support structure may include securing the dome support structure (which may include a collapsible dome and a cover member coupled thereto) to an assembly head of a component placement apparatus (e.g., a pick-and-place machine). After securing the dome support structure to the assembly head, the assembly head may position the pivot pin (or pivot pins) of the butterfly hinge in the retention channel (or retention channels) of the dome support structure, and then secure the butterfly hinge to the assembly head. For example, the assembly head may pick up a dome support structure, move the assembly head to an available butterfly hinge, place the dome support structure in the opening defined by the butterfly hinge (e.g., the area inside the wings) such that the pins are received in the channels, and then pick up both the butterfly hinge and the dome support structure. The input subassembly may then be positioned on the base plate and released from the assembly head.

Where pick-and-place or SMT machines are used to assemble the switch subassemblies and couple the switch subassemblies to the base plate, components may be provided to the machines using tape-and-reel systems. For example, multiple butterfly hinges may be formed on a carrier or web that can be provided to an assembly machine on rolls or strips that hold multiple butterfly hinges. The assembly machine may separate individual butterfly hinges as they are needed for assembly. Similarly, an assembly machine may be provided with multiple switch packages (e.g., pre-assembled units that include dome support structures, collapsible domes, and cover members) on rolls or strips. The switch packages may be separated from a web or other carrier as they are needed for assembly.

In some cases, the switch packages are formed in a similar manner. For example, domes, dome support structures, and/or cover members may be provided to an assembly machine on webs, tapes, or other carriers to be separated from the carriers as they are needed. Assembled switch packages may be provided directly from the assembly operation to a keyboard assembly operation, as described above, or they may be tested or otherwise further processed prior to being assembled into a keyboard.

Any of the components described herein may include fiducial markers (or simply "fiducials") that facilitate pick-and-place or other automated assembly and manufacturing processes. For example, switch packages and butterfly hinges may each include fiducials to facilitate assembly of an input subassembly. More particularly, an assembly machine may include cameras, vision systems, or other sensors that detect the fiducials to help identify, locate, and position the components relative to one another during assembly of the input subassembly. Similarly, a keyboard base plate may include fiducials to help position input subassemblies relative to the base plate during assembly of the keyboard. Fiducials may be incorporated in or on the components in any appropriate way. For example, they may be printed, applied (e.g., as a sticker or other layer), etched, molded, machined, or the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A keyboard, comprising:
a substrate defining a first opening and a second opening;
a keycap; and
a butterfly hinge supporting the keycap above the substrate and comprising:
   a first wing comprising:
      a first cross-beam overlapping the first opening; and
      a first pair of arms extending from the first cross-beam; and
   a second wing coupled to the first wing and comprising:
      a second cross-beam overlapping the second opening; and
      a second pair of arms extending from the second cross-beam; and
   a living hinge comprising a flexible material; wherein the living hinge joins an end of a first arm of the first pair of arms to an end of a second arm of the second pair of arms, thereby coupling the first wing to the second wing.

2. The keyboard of claim 1, wherein:
the substrate is a printed circuit board;
the first wing further comprises:
   a first keycap pivot pin extending from a first end of the first cross-beam; and
   a second keycap pivot pin extending from a second end of the first cross-beam opposite the first end of the first cross-beam;
the second wing further comprises:
   a third keycap pivot pin extending from a first end of the second cross-beam; and
   a fourth keycap pivot pin extending from a second end of the second cross-beam opposite the first end of the second cross-beam; and
the keycap is coupled to the butterfly hinge via the first, second, third, and fourth keycap pivot pins.

3. The keyboard of claim 1, wherein:
the keyboard further comprises a switch body attached to the substrate; and
the first wing and the second wing are pivotally coupled to the switch body.

4. The keyboard of claim 1, wherein the first cross-beam comprises a recess formed therein, the recess overlapping the first opening.

5. The keyboard of claim 1, wherein:
the substrate further defines a third opening and a fourth opening;
one of the arms of the first pair of arms overlaps the third opening; and
the other arm of the first pair of arms overlaps the fourth opening.

6. The keyboard of claim 5, wherein:
the substrate further defines a fifth opening and a sixth opening;
one of the arms of the second pair of arms overlaps the fifth opening; and
the other arm of the second pair of arms overlaps the sixth opening.

7. A keyboard, comprising:
a substrate defining an opening;
a keycap; and a support mechanism supporting the keycap above the substrate and allowing the keycap to move between a depressed position and an undepressed position, the support mechanism comprising:
a wing comprising:
a cross-beam; and
a pair of arms extending from the cross-beam; wherein
the cross-beam comprises a recess;
the opening in the substrate is below the cross-beam;
the recess and the opening in the substrate define an empty space when the keycap is in the depressed position; and
the empty space is at least partially below the cross-beam and is configured to receive debris therein.

8. The keyboard of claim 7, wherein a portion of the cross-beam is substantially flush with the substrate when the keycap is in the depressed position.

9. The keyboard of claim 7, wherein:
the substrate defines an additional opening; and
the support mechanism comprises an additional wing, comprising:
an additional cross-beam configured to cooperate with the additional opening in the substrate to define an additional empty space below the additional cross-beam when the keycap is in the depressed position; and
a pair of additional arms extending from the additional cross-beam.

10. The keyboard of claim 9, wherein the cross-beam comprises an additional recess formed therein, the additional recess cooperating with the additional opening in the substrate to define the additional empty space.

11. The keyboard of claim 10, wherein less than half of an area of a bottom side of the support mechanism contacts the substrate when the keycap is in the depressed position.

12. The keyboard of claim 9, wherein the wing and the additional wing are coupled together via a living hinge connecting one arm of the pair of arms to one arm of the pair of additional arms.

13. The keyboard of claim 4, wherein the recess cooperates with the first opening to define an empty space when the keycap is in a depressed position.

14. A keyboard, comprising:
a keycap;
a substrate below the keycap;
a switch body attached to the substrate; and
a support mechanism supporting the keycap above the substrate and allowing the keycap to move between a depressed position and an undepressed position, the support mechanism comprising:
a first wing comprising:
a first arm pivotally coupled to the switch body and the keycap;
a second arm pivotally coupled to the switch body and the keycap; and
a first cross-beam extending between the first arm and the second arm;
a second wing coupled to the first wing, comprising:
a third arm pivotally coupled to the switch body and the keycap;
a fourth arm pivotally coupled to the switch body and the keycap; and
a second cross-beam extending between the third arm and the fourth arm; and
a living hinge comprising a flexible material joining an end of the first arm to an end of the third arm;
wherein the substrate defines an opening positioned below the first cross-beam and configured to define an empty space below the first cross-beam when the keycap is in the depressed position.

15. The keyboard of claim 14, wherein:
the opening is a first opening;
the empty space is a first empty space;
the substrate further defines a second opening positioned below the first arm and configured to define a second empty space below the first arm when the keycap is in the depressed position; and
the substrate further defines a third opening positioned below the second arm and configured to define a third empty space below the second arm when the keycap is in the depressed position.

16. The keyboard of claim 15, wherein:
the first wing and the second wing cooperate to define a fourth opening between the first, second, third, and fourth arms; and
the switch body is within the fourth opening when the keycap is in the depressed position.

17. The keyboard of claim 14, wherein the flexible material is an elastomeric material at least partially encapsulating a terminal portion of the first arm and a terminal portion of the third arm.

18. The keyboard of claim 15, wherein the first cross-beam comprises a recess configured to align with the first opening and cooperate with the first opening to define the first empty space when the keycap is in the depressed position.

19. A laptop computer comprising:
a display portion;
a display positioned at least partially within the display portion;
a base portion pivotally coupled to the display portion;
a keyboard at least partially within the base portion and comprising a key; wherein
the key comprises:
a keycap;
a switch body below the keycap; and
a support mechanism supporting the keycap and allowing the keycap to move between a depressed position and an undepressed position, the support mechanism comprising:
a first wing comprising:
a first cross-beam; and
a first pair of arms extending from the first cross-beam; and
a second wing coupled to the first wing and comprising:
a second cross-beam; and
a second pair of arms extending from the second cross-beam; and
a living hinge coupling the first wing to the second wing and comprising an elastomeric material at least partially encapsulating one of the first pair of arms and one of the second pair of arms.

20. The laptop computer of claim 19, wherein:
the base portion further comprises a substrate;
the switch body is attached to the substrate; and
the substrate defines an opening positioned below the first cross-beam.

21. The laptop computer of claim 20, wherein:
the first cross-beam defines a recess; and the recess cooperates with the opening to define an empty space below the first cross-beam when the keycap is in a depressed position.

* * * * *